United States Patent
Lee et al.

(10) Patent No.: US 10,454,725 B1
(45) Date of Patent: Oct. 22, 2019

(54) C-PHY RECEIVER EQUALIZATION

(71) Applicant: QUALCOMM Incorporated, San Diego, CA (US)

(72) Inventors: Chulkyu Lee, San Diego, CA (US); Jae Min Shin, San Diego, CA (US); George Alan Wiley, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/144,582

(22) Filed: Sep. 27, 2018

(51) Int. Cl.
| | |
|---|---|
| *H04L 25/03* | (2006.01) |
| *H04L 25/49* | (2006.01) |
| *H04B 3/54* | (2006.01) |
| *G06F 13/38* | (2006.01) |

(52) U.S. Cl.
CPC ...... *H04L 25/03885* (2013.01); *G06F 13/385* (2013.01); *H04B 3/54* (2013.01); *H04L 25/03057* (2013.01); *H04L 25/4917* (2013.01)

(58) Field of Classification Search
CPC ......... H04L 25/03885; H04L 25/03057; H04L 25/4917; H04L 7/0331; H04L 25/03019; H04L 2025/03484; H04L 2025/0349; H04L 2025/03636; H04L 25/03261; H04L 27/01; H04L 25/03267; H04L 7/0334; H04B 3/54; H04B 1/123; G06F 13/385
See application file for complete search history.

(56) References Cited

U.S. PATENT DOCUMENTS

| | | |
|---|---|---|
| 9,215,113 B1 | 12/2015 | Chen et al. |
| 9,350,572 B1 * | 5/2016 | Kang ................ H04L 25/03057 |
| 9,397,824 B1 * | 7/2016 | Hoshyar ............... H04L 7/0331 |
| 9,553,635 B1 * | 1/2017 | Sejpal ...................... H04B 3/54 |
| 9,654,327 B2 | 5/2017 | Liao et al. |
| 2017/0026083 A1 | 1/2017 | Sejpal et al. |
| 2017/0039163 A1 * | 2/2017 | Sejpal ................ G06F 13/4291 |
| 2017/0244371 A1 * | 8/2017 | Turker Melek ...... H03G 1/0029 |
| 2018/0062883 A1 * | 3/2018 | Duan ............... G01R 31/31709 |

FOREIGN PATENT DOCUMENTS

WO    2018074251 A1    4/2018

* cited by examiner

*Primary Examiner* — Khanh C Tran
(74) *Attorney, Agent, or Firm* — Loza & Loza, LLP/Qualcomm

(57) ABSTRACT

Methods, apparatus, and systems for data communication over a multi-wire, multi-phase interface are disclosed. A method includes equalizing three-phase signals received from two wires of the interface to provide equalized signals, providing first and second difference signals by comparing voltage differences between the equalized signals with first and second reference voltage levels respectively, capturing delayed and undelayed versions of the second difference signal using flipflops triggered by different edges in the first difference signal, and adjusting an equalizing circuit until outputs of the first flipflops indicate that a ratio of low-frequency attenuation to high-frequency amplification has been achieved that enables information to be accurately decoded from the three-phase signals. The three-phase signal received from a first of the two wires is in a different phase than the three-phase signal received from a second of the two wires.

30 Claims, 21 Drawing Sheets

C-PHY RECEIVER EQUALIZATION

TECHNICAL FIELD

The present disclosure relates generally to high-speed data communications interfaces, and more particularly, to equalization in a receiver coupled to a multi-wire, multi-phase data communication link.

BACKGROUND

Manufacturers of mobile devices, such as cellular phones, may obtain components of the mobile devices from various sources, including different manufacturers. For example, an application processor in a cellular phone may be obtained from a first manufacturer, while an imaging device or camera may be obtained from a second manufacturer, and a display may be obtained from a third manufacturer. The application processor, the imaging device, the display controller, or other types of device may be interconnected using a standards-based or proprietary physical interface. In one example, an imaging device may be connected using the Camera Serial Interface (CSI) defined by the Mobile Industry Processor Interface (MIPI) Alliance. In another example, a display may include an interface that conforms to the Display Serial Interface (DSI) standard specified by the Mobile Industry Processor Interface (MIPI) Alliance.

A multiphase three-wire (C-PHY) interface defined by the MIPI Alliance uses a trio of conductors to transmit information between devices. Each of the three wires may be in one of three signaling states during transmission of a symbol over the C-PHY interface. Clock information is encoded in a sequence of symbols transmitted on the C-PHY interface and a receiver generates a clock signal from transitions between consecutive symbols. The maximum speed of the C-PHY interface and the ability of a clock and data recovery (CDR) circuit to recover clock information may be limited by voltage levels and maximum time variation corresponding to transitions of signals transmitted on the different wires of the communication link There is an ongoing need for improved clock generation circuits as signaling frequencies of multi-wire interfaces increase.

SUMMARY

Embodiments disclosed herein provide systems, methods and apparatus that enable improved communications on a multi-wire and/or multiphase communications link. The communications link may be deployed in apparatus such as a mobile terminal having multiple Integrated Circuit (IC) devices.

In various aspects of the disclosure, a method of equalization is performed at a receiver and includes equalizing three-phase signals received from two wires of a 3-wire interface to provide equalized signals, providing a first difference signal obtained by comparing a voltage difference between the equalized signals with a first reference voltage level, providing a second difference signal obtained by comparing the voltage difference between the equalized signals with a second reference voltage level, using a first type of edge in the first difference signal to capture a delayed version of the second difference signal at a first bi-stable device, using a second type of edge in the first difference signal to capture the second difference signal at a second bi-stable device, and adjusting an equalizing circuit of the receiver until outputs of the first bi-stable device and the second bi-stable device indicate that a ratio of low-frequency attenuation to high-frequency amplification has been achieved that enables information to be accurately decoded from the three-phase signals. The three-phase signal received from a first of the two wires is in a different phase than the three-phase signal received from a second of the two wires. In one aspect, the equalizing circuit is adjusted while a training pattern is received in the three-phase signals.

In certain aspects, the method includes iteratively adjusting a delay period used to produce the delayed version of the second difference signal. The delay period may be adjusted before, during or after adjustment of parameters controlling operation of the equalizing circuit. The delay period may be adjusted until the outputs of the first bi-stable device and the second bi-stable device indicate that a ratio of low-frequency attenuation to high-frequency amplification has been achieved that enables information to be accurately decoded from the three-phase signals. Parameters that control operation of the equalizing circuit may include a resistance value or a capacitance value.

In some aspects, the first reference voltage level corresponds to a middle voltage level at a midpoint between maximum and minimum voltage levels specified for the first difference signal and the second difference signal, and the second reference voltage level is offset from the middle voltage level. The first bi-stable device may be a flipflop that responds to negative-to-positive transitions in the first difference signal and the second bi-stable device may be a flipflop that responds to positive-to-negative transitions in the first difference signal. In one example, the equalizing circuit is adjusted until outputs of the first bi-stable device and the second bi-stable device have opposite binary values.

In various aspects of the disclosure, a bus interface device has an equalizing receiver configured to provide equalized signals from three-phase signals received from two wires of a 3-wire interface, a first comparator configured to provide a first difference signal obtained by comparing a voltage difference between the equalized signals with a first reference voltage level, a second comparator configured to provide a second difference signal obtained by comparing the voltage difference between the equalized signals with a second reference voltage level, a first bi-stable device configured to capture a delayed version of the second difference signal as an output in response to a first type of edge in the first difference signal, a second bi-stable device configured to capture the second difference signal as an output in response to a second type of edge in the first difference signal, and a control block configured to adjust equalization parameters of the equalizing receiver until the outputs of the first bi-stable device and the second bi-stable device indicate that a ratio of low-frequency attenuation to high-frequency amplification has been achieved that enables information to be accurately decoded from the three-phase signals. The three-phase signal received from a first of the two wires is in a different phase than the three-phase signal received from a second of the two wires.

In various aspects of the disclosure, a receiving apparatus includes means for equalizing three-phase signals received from two wires of a 3-wire interface to provide equalized signals, means for providing a first difference signal obtained by comparing a voltage difference between the equalized signals with a first reference voltage level; means for providing a second difference signal obtained by comparing the voltage difference between the equalized signals with a second reference voltage level, means for capturing difference signals, including a first bi-stable device configured to use a first type of edge in the first difference signal to capture a delayed version of the second difference signal, and a second bi-stable device configured to use a second type of edge in the first difference signal to capture the second difference signal, and means for adjusting an equalizing circuit of the receiving apparatus, configured to adjust one or more equalization parameters until outputs of the first bi-stable device and the second bi-stable device indicate that a ratio of low-frequency attenuation to high-frequency amplification has been achieved that enables information to be accurately decoded from the three-phase signals. The three-phase signal received from a first of the two wires is in a different phase than the three-phase signal received from a second of the two wires.

In various aspects of the disclosure, a processor-readable storage medium is disclosed. The storage medium may be a non-transitory storage medium and may store code that, when executed by one or more processors, causes the one or more processors to equalize three-phase signals received from two wires of a 3-wire interface to provide equalized signals, provide a first difference signal obtained by comparing a voltage difference between the equalized signals with a first reference voltage level, provide a second difference signal obtained by comparing the voltage difference between the equalized signals with a second reference voltage level, use a first type of edge in the first difference signal to capture a delayed version of the second difference signal at a first bi-stable device, use a second type of edge in the first difference signal to capture the second difference signal at a second bi-stable device, and adjust an equalizing circuit of the receiver until outputs of the first bi-stable device and the second bi-stable device indicate that a ratio of low-frequency attenuation to high-frequency amplification has been achieved that enables information to be accurately decoded from the three-phase signals. The three-phase signal received from a first of the two wires is in a different phase than the three-phase signal received from a second of the two wires.

DETAILED DESCRIPTION

Figure 1:
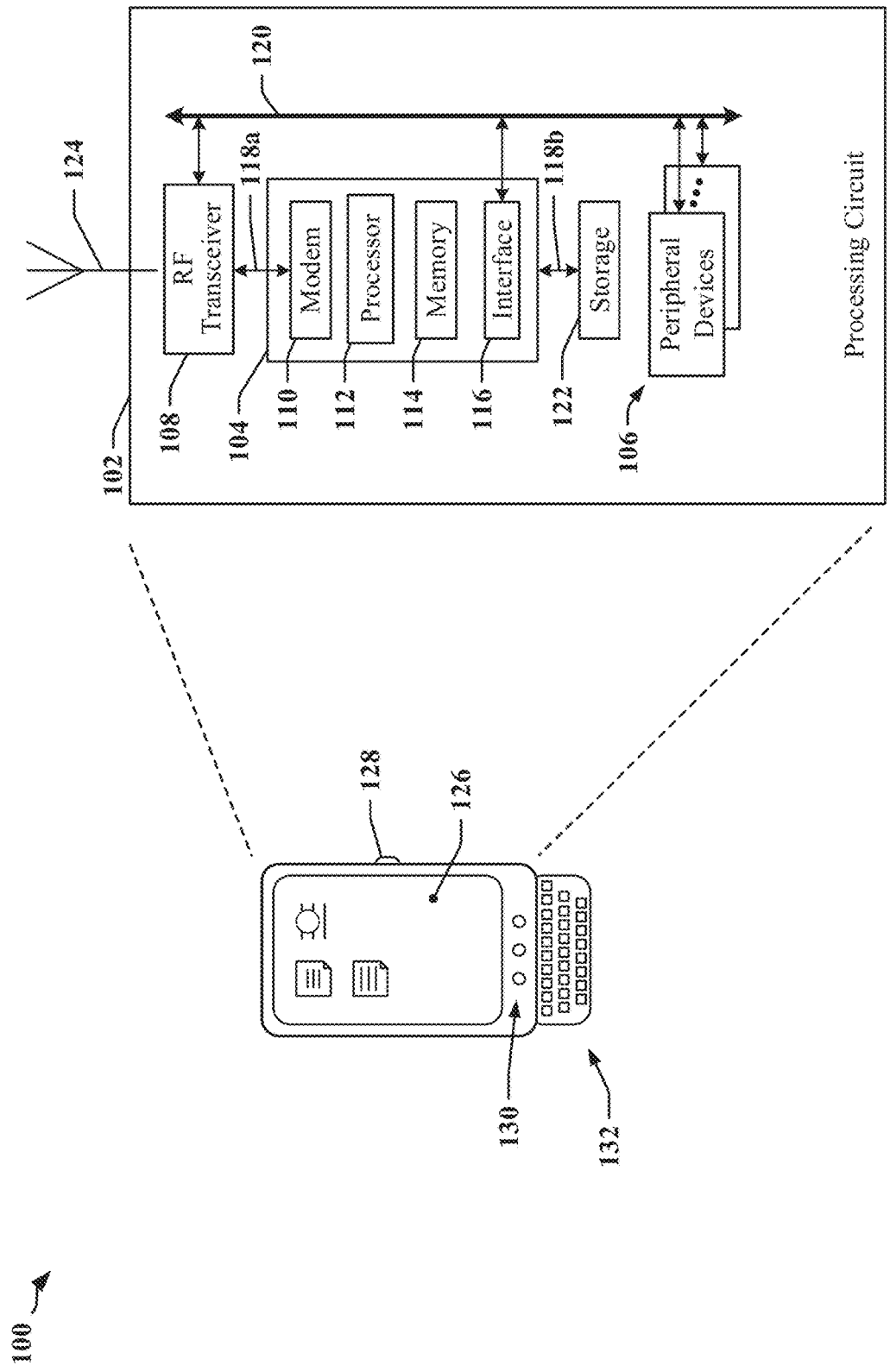
FIG. 1 depicts an apparatus employing a data link between IC devices that selectively operates according to one of plurality of available standards.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

As used in this application, the terms "component," "module," "system" and the like are intended to include a computer-related entity, such as, but not limited to hardware, firmware, a combination of hardware and software, software, or software in execution. For example, a component may be, but is not limited to being, a process running on a processor, a processor, an object, an executable, a thread of execution, a program and/or a computer. By way of illustration, both an application running on a computing device and the computing device can be a component. One or more components can reside within a process and/or thread of execution and a component may be localized on one computer and/or distributed between two or more computers. In addition, these components can execute from various computer-readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Overview

Certain aspects of the invention may be applicable to a C-PHY interface specified by the MIPI Alliance, which may be deployed to connect electronic devices that are subcomponents of a mobile apparatus such as a telephone, a mobile computing device, an appliance, automobile electronics, avionics systems, etc. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, a wearable computing device (e.g., a smartwatch, a health or fitness tracker, etc.), an appliance, a sensor, a vending machine, or any other similarly functioning device.

The C-PHY interface is a high-speed serial interface that can provide high throughput over bandwidth-limited channels. The C-PHY interface may be deployed to connect application processors to peripherals, including displays and cameras. The C-PHY interface encodes data into symbols that are transmitted in a three-phase signal over a set of three wires, which may be referred to as a trio, or trio of wires. The three-phase signal is transmitted on each wire of the trio in different phases. Each three-wire trio provides a lane on a communications link A symbol interval may be defined as the interval of time in which a single symbol controls the signaling state of a trio. In each symbol interval, one wire is "undriven" while the remaining two of the three wires are differentially driven such that one of the two differentially driven wires assumes a first voltage level and the other differentially driven wire assumes to a second voltage level different from the first voltage level. The undriven wire may float, be driven, and/or be terminated such that it assumes a third voltage level that is at or near the mid-level voltage between the first and second voltage levels. In one example, the driven voltage levels may be +V and −V with the undriven voltage being 0 V. In another example, the driven voltage levels may be +V and 0 V with the undriven voltage being +V/2. Different symbols are transmitted in each consecutively transmitted pair of symbols, and different pairs of wires may be differentially driven in different symbol intervals.

A C-PHY 3-phase encoder may encode data in a signal that has three or more valid signaling states that has at least one transition at every symbol boundary. A C-PHY receiver may recover a clock using transitions guaranteed to occur at every symbol boundary. In conventional systems, a receiver determines a transition on a first signal wire at a symbol boundary, and masks any occurrences of transitions on other signal wires that are associated with the same symbol boundary. Multiple receiver transitions may occur due to slight differences in rise and fall time between the signals carried on the three wires (i.e. the trio of wires) and due to slight differences in signal propagation times between the combinations of signal pairs received.

The differences in propagation time may be exacerbated by attenuation of high-frequency components in the signal during transmission. An equalizer may be used to limit the effect of high-frequency attenuation in a conventional differential interface. In a C-PHY interface, the receiver can detect multiple signaling states representing the differences between pairs of wires in the trio. Certain aspects disclosed herein provide an equalizer that can be used in a C-PHY interface. In one example, an equalizing receiver is configured to provide equalized signals from three-phase signals received from two wires of a 3-wire interface, a first comparator is configured to provide a first difference signal obtained by comparing a voltage difference between the equalized signals with a first reference voltage level, a second comparator is configured to provide a second difference signal obtained by comparing the voltage difference between the equalized signals with a second reference voltage level, a first bi-stable device is configured to capture a delayed version of the second difference signal as an output in response to a first type of edge in the first difference signal, a second bi-stable device is configured to capture the second difference signal as an output in response to a second type of edge in the first difference signal, and a control block is configured to adjust equalization parameters of the equalizing receiver until the outputs of the first bi-stable device and the second bi-stable device indicate that a ratio of low-frequency attenuation to high-frequency amplification has been achieved that enables information to be accurately decoded from the three-phase signals. The three-phase signal received from a first of the two wires is in a different phase than the three-phase signal received from a second of the two wires.

FIG. 1 depicts an example of apparatus 100 that may employ a C-PHY 3-phase communication link. The apparatus 100 may include an SoC a processing circuit 102 having multiple circuits or devices 104, 106 and/or 108, which may be implemented in one or more ASICs or in an SoC. In one example, the apparatus 100 may be a communication device and the processing circuit 102 may include a processing device provided in an ASIC 104, one or more peripheral devices 106, and a transceiver 108 that enables the apparatus to communicate through an antenna 124 with a radio access network, a core access network, the Internet and/or another network.

The ASIC 104 may have one or more processors 112, one or more modems 110, on-board memory 114, a bus interface circuit 116 and/or other logic circuits or functions. The processing circuit 102 may be controlled by an operating system that may provide an application programming interface (API) layer that enables the one or more processors 112 to execute software modules residing in the on-board memory 114 or other processor-readable storage 122 provided on the processing circuit 102. The software modules may include instructions and data stored in the on-board memory 114 or processor-readable storage 122. The ASIC 104 may access its on-board memory 114, the processor-readable storage 122, and/or storage external to the processing circuit 102. The on-board memory 114, the processor-readable storage 122 may include read-only memory (ROM) or random-access memory (RAM), electrically erasable programmable ROM (EEPROM), flash cards, or any memory device that can be used in processing systems and computing platforms. The processing circuit 102 may include, implement, or have access to a local database or other parameter storage that can maintain operational parameters and other information used to configure and operate the apparatus 100 and/or the processing circuit 102. The local database may be implemented using registers, a database module, flash memory, magnetic media, EEPROM, soft or hard disk, or the like. The processing circuit 102 may also be operably coupled to external devices such as the antenna 124, a display 126, operator controls, such as switches or buttons 128, 130 and/or an integrated or external keypad 132, among other components. A user interface module may be configured to operate with the display 126, external keypad 132, etc. through a dedicated communication link or through one or more serial data interconnects.

The processing circuit 102 may provide one or more buses 118a, 118b, 120 that enable certain devices 104, 106, and/or 108 to communicate. In one example, the ASIC 104 may include a bus interface circuit 116 that includes a combination of circuits, counters, timers, control logic and other configurable circuits or modules. In one example, the bus interface circuit 116 may be configured to operate in accordance with communication specifications or protocols. The processing circuit 102 may include or control a power management function that configures and manages the operation of the apparatus 100.

Figure 2:
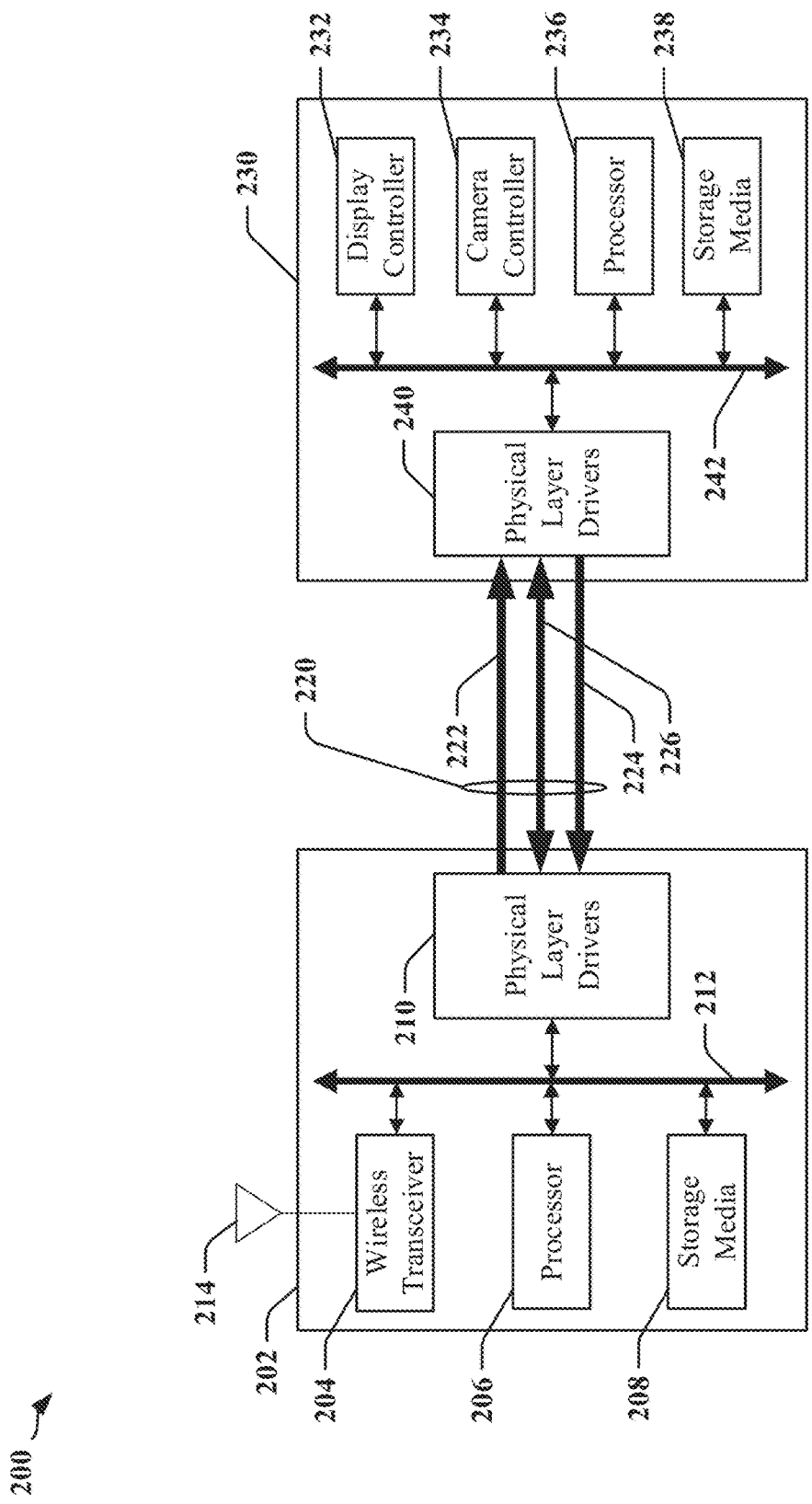
FIG. 2 illustrates a system architecture for an apparatus employing a data link between IC devices according certain aspects disclosed herein.

FIG. 2 is a block schematic illustrating certain aspects of an apparatus 200 that includes a plurality of IC devices 202 and 230, which can exchange data and control information through a communication link 220. The communication link 220 may be used to connect a pair of IC devices 202 and 230 that are located in close proximity to one another, or that are physically located in different parts of the apparatus 200. In one example, the communication link 220 may be provided on a chip carrier, substrate or circuit board that carries the IC devices 202 and 230. In another example, a first IC device 202 may be located in a keypad section of a flip-phone while a second IC device 230 may be located in a display section of the flip-phone. In another example, a portion of the communication link 220 may include a cable or optical connection.

The communication link 220 may include multiple channels 222, 224 and 226. One or more channel 226 may be bidirectional, and may operate in half-duplex and/or full-duplex modes. One or more channel 222 and 224 may be unidirectional. The communication link 220 may be asymmetrical, providing higher bandwidth in one direction. In one example described herein, a first channel 222 may be referred to as a forward channel 222 while a second channel 224 may be referred to as a reverse channel 224. The first IC device 202 may be designated as a host system or transmitter, while the second IC device 230 may be designated as a client system or receiver, even if both IC devices 202 and 230 are configured to transmit and receive on the channel 222. In one example, the forward channel 222 may operate at a higher data rate when communicating data from a first IC device 202 to a second IC device 230, while the reverse channel 224 may operate at a lower data rate when communicating data from the second IC device 230 to the first IC device 202.

The IC devices 202 and 230 may each include a processor or other processing and/or computing circuit or device 206, 236. In one example, the first IC device 202 may perform core functions of the apparatus 200, including establishing and maintaining wireless communications through a wireless transceiver 204 and an antenna 214, while the second IC device 230 may support a user interface that manages or operates a display controller 232, and may control operations of a camera or video input device using a camera controller 234. Other features supported by one or more of the IC devices 202 and 230 may include a keyboard, a voice-recognition component, and other input or output devices. The display controller 232 may include circuits and software drivers that support displays such as a liquid crystal display (LCD) panel, touch-screen display, indicators and so on. The storage media 208 and 238 may include transitory and/or non-transitory storage devices adapted to maintain instructions and data used by respective processors 206 and 236, and/or other components of the IC devices 202 and 230. Communication between each processor 206, 236 and its corresponding storage media 208 and 238 and other modules and circuits may be facilitated by one or more internal bus 212 and 242 and/or a channel 222, 224 and/or 226 of the communication link 220.

The reverse channel 224 may be operated in the same manner as the forward channel 222, and the forward channel 222, and the reverse channel 224 may be capable of transmitting at comparable speeds or at different speeds, where speed may be expressed as data transfer rate and/or clocking rates. The forward and reverse data rates may be substantially the same or differ by orders of magnitude, depending on the application. In some applications, a single bidirectional channel 226 may support communications between the first IC device 202 and the second IC device 230. The forward channel 222 and/or the reverse channel 224 may be configurable to operate in a bidirectional mode when, for example, the forward and reverse channels 222 and 224 share the same physical connections and operate in a half-duplex manner. In one example, the communication link 220 may be operated to communicate control, command and other information between the first IC device 202 and the second IC device 230 in accordance with an industry or other standard.

The communication link 220 of FIG. 2 may be implemented according to MIPI Alliance specifications for C-PHY and may provide a wired bus that includes a plurality of signal wires (denoted as M wires). The M wires may be configured to carry N-phase encoded data in a high-speed digital interface, such as a mobile display digital interface (MDDI). The M wires may facilitate N-phase polarity encoding on one or more of the channels 222, 224 and 226. The physical layer drivers 210 and 240 may be configured or adapted to generate N-phase polarity encoded data for transmission on the communication link 220. The use of N-phase polarity encoding provides high speed data transfer and may consume half or less of the power of other interfaces because fewer drivers are active in N-phase polarity encoded data links.

The physical layer drivers 210 and 240 can typically encode multiple bits per transition on the communication link 220 when configured for N-phase polarity encoding. In one example, a combination of 3-phase encoding and polarity encoding may be used to support a wide video graphics array (WVGA) 80 frames per second LCD driver IC without a frame buffer, delivering pixel data at 810 Mbps for display refresh.

Figure 3:
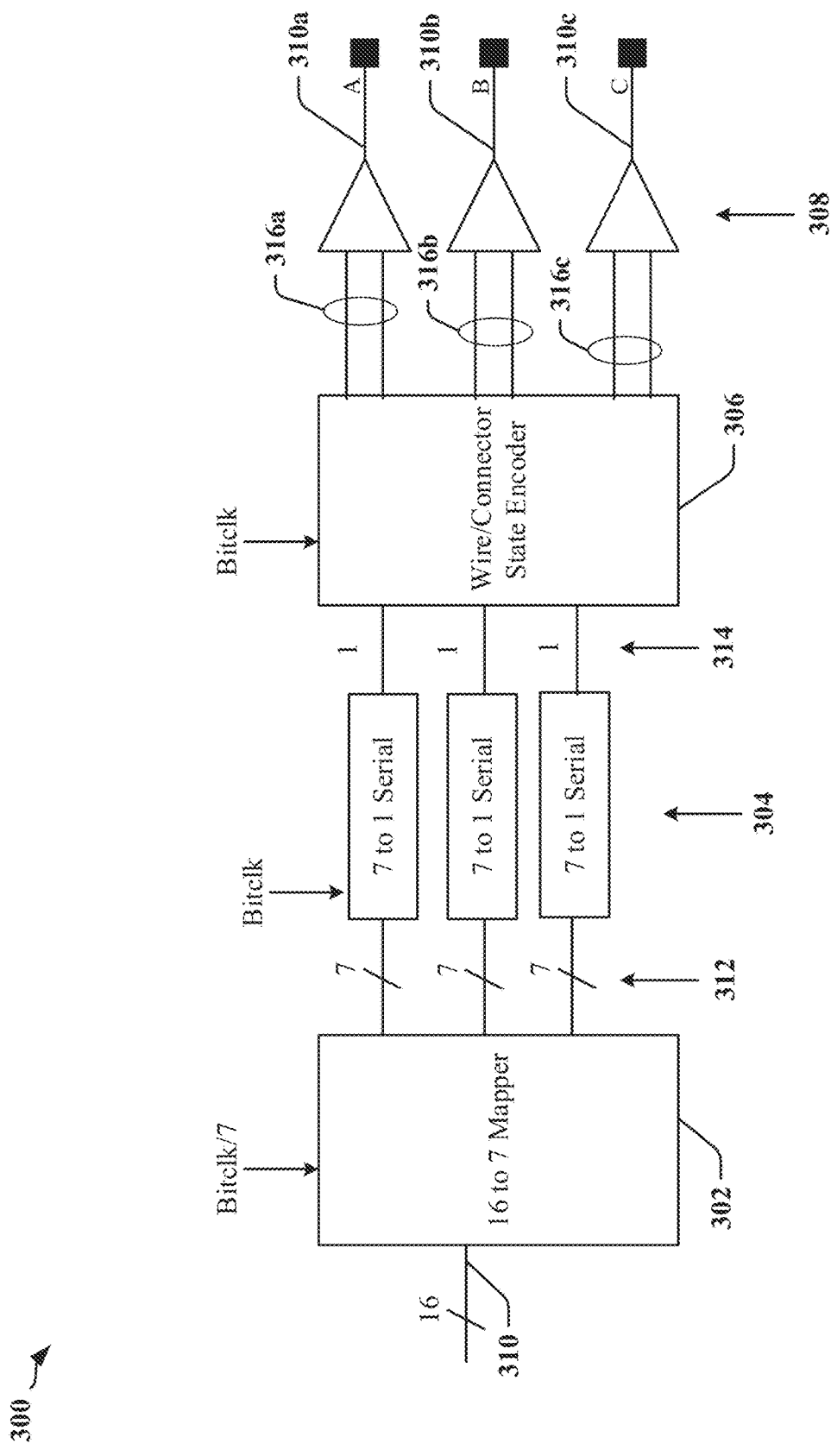
FIG. 3 illustrates a C-PHY 3-phase data encoder.

FIG. 3 is a diagram illustrating a C-PHY interface 300 in a transmitting device that may be used to implement certain aspects of the communication link 220 depicted in FIG. 2. The example of 3-phase encoding is selected solely for the purpose of simplifying descriptions of certain aspects of the invention. The principles and techniques disclosed for 3-phase encoders, as used in a C-PHY encoder for example, can be applied in other configurations of N-phase polarity encoders associated with an M-wire interface.

Signaling states defined for each of the 3 wires used in a 3-phase polarity encoding scheme may include an undriven state, a positively driven state and a negatively driven state. The positively driven state and the negatively driven state may be obtained by providing a voltage differential between two of the signal wires 310a, 310b and/or 310c, and/or by driving a current through two of the signal wires 310a, 310b and/or 310c connected in series such that the current flows in different directions in the two signal wires 310a, 310b and/or 310c. The undriven state may be realized by placing an output of a driver of a signal wire 310a, 310b or 310c in a high-impedance mode. Alternatively, or additionally, an undriven state may be obtained on a signal wire 310a, 310b or 310c by passively or actively causing an "undriven" signal wire 310a, 310b or 310c to attain a voltage level that lies substantially halfway between positive and negative voltage levels provided on driven signal wires 310a, 310b and/or 310c. Typically, there is no significant current flow through an undriven signal wire 310a, 310b or 310c. Signaling states defined for a 3-phase polarity encoding scheme may be denoted using the three voltage or current states (+1, −1, and 0).

A 3-phase polarity encoding interface may employ line drivers 308 to control the signaling state of signal wires 310a, 310b and 310c. The line drivers 308 may be implemented as unit-level current-mode or voltage-mode drivers. In one example, each line driver 308 may receive sets of two or more of signals 316a, 316b and 316c that determine the output state of corresponding signal wires 310a, 310b and 310c. In one example, the sets of two signals 316a, 316b and 316c may include a pull-up signal (PU signal) and a pull-down signal (PD signal) that, when high, activate pull-up and pull down circuits that drive the signal wires 310a, 310b and 310c toward a higher level or lower level voltage, respectively. In this example, when both the PU signal and the PD signal are low, the signal wires 310a, 310b and 310c may be terminated to a mid-level voltage.

For each transmitted symbol interval in an M-wire, N-phase polarity encoding scheme, at least one signal wire 310a, 310b or 310c is in the midlevel/undriven (0) voltage or current state, while the number of positively driven (+1 voltage or current state) signal wires 310a, 310b or 310c is equal to the number of negatively driven (−1 voltage or current state) signal wires 310a, 310b or 310c, such that the sum of current flowing to the receiver is always zero. For each symbol, the state of at least one signal wire 310a, 310b or 310c is changed from the symbol transmitted in the preceding transmission interval.

In operation, a mapper 302 may receive and map 16-bit data 310 to 7 symbols 312. In the 3-wire example, each of the 7 symbols defines the states of the signal wires 310a, 310b and 310c for one symbol interval. The 7 symbols 312 may be serialized using parallel-to-serial converters 304 that provide a timed sequence of symbols 314 for each signal wire 310a, 310b and 310c. The sequence of symbols 314 is typically timed using a transmission clock. A 3-wire 3-phase wire state encoder 306 receives the sequence of 7 symbols 314 produced by the mapper one symbol at a time and computes the state of each signal wire 310a, 310b and 310c for each symbol interval. The 3-wire wire state encoder 306 selects the states of the signal wires 310a, 310b and 310c based on the current input symbol 314 and the previous states of signal wires 310a, 310b and 310c.

The use of M-wire, N-phase encoding permits a number of bits to be encoded in a plurality of symbols where the bits per symbol is not an integer. In the example of a 3-wire communications link, there are 3 available combinations of 2 wires, which may be driven simultaneously, and 2 possible combinations of polarity on the pair of wires that is driven, yielding 6 possible states. Since each transition occurs from a current state, 5 of the 6 states are available at every transition. The state of at least one wire is required to change at each transition. With 5 states, $\log_2(5) \approx 2.32$ bits may be encoded per symbol. Accordingly, a mapper may accept a 16-bit word and convert it to 7 symbols because 7 symbols carrying 2.32 bits per symbol can encode 16.24 bits. In other words, a combination of seven symbols that encode five states has $5^7$ (78,125) permutations. Accordingly, the 7 symbols may be used to encode the $2^{16}$ (65,536) permutations of 16 bits.

Figure 4:
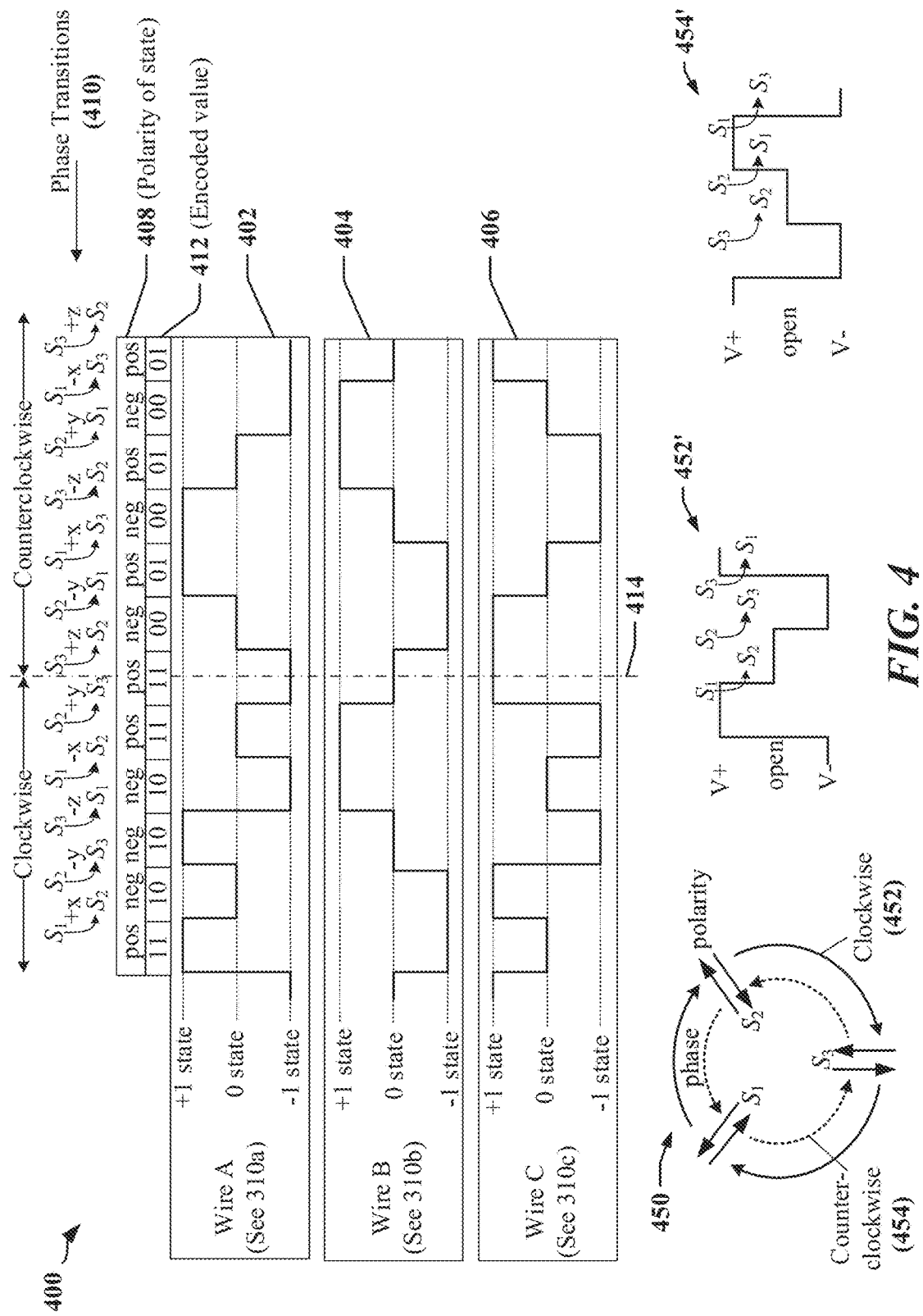
FIG. 4 illustrates signaling in a C-PHY 3-phase encoded interface.

FIG. 4 includes an example of a timing diagram 400 for signals encoded using a three-phase modulation data-encoding scheme, which is based on the circular state diagram 450. Information may be encoded in a sequence of signaling states where, for example, a wire or connector is in one of three phase states $S_1$, $S_2$ and $S_3$ defined by the circular state diagram 450. Each state may be separated from the other states by a 120° phase shift. In one example, data may be encoded in the direction of rotation of phase states on the wire or connector. The phase states in a signal may rotate in clockwise direction 452 and 452' or counterclockwise direction 454 and 454'. In the clockwise direction 452 and 452' for example, the phase states may advance in a sequence that includes one or more of the transitions from $S_1$ to $S_2$, from $S_2$ to $S_3$ and from $S_3$ to $S_1$. In the counterclockwise direction 454 and 454', the phase states may advance in a sequence that includes one or more of the transitions from $S_1$ to $S_3$, from $S_3$ to $S_2$ and from $S_2$ to $S_1$. The three signal wires 310a, 310b and 310c carry different versions of the same signal, where the versions may be phase shifted by 120° with respect to one another. Each signaling state may be represented as a different voltage level on a wire or connector and/or a direction of current flow through the wire or connector. During each of the sequence of signaling states in a 3-wire system, each signal wire 310a, 310b and 310c is in a different signaling states than the other wires. When more than 3 signal wires 310a, 310b and 310c are used in a 3-phase encoding system, two or more signal wires 310a, 310b and/or 310c can be in the same signaling state at each signaling interval, although each state is present on at least one signal wire 310a, 310b and/or 310c in every signaling interval.

Information may be encoded in the direction of rotation at each phase transition 410, and the 3-phase signal may change direction for each signaling state. Direction of rotation may be determined by considering which signal wires 310a, 310b and/or 310c are in the '0' state before and after a phase transition, because the undriven signal wire 310a, 310b and/or 310c changes at every signaling state in a rotating three-phase signal, regardless of the direction of rotation.

The encoding scheme may also encode information in the polarity 408 of the two signal wires 310a, 310b and/or 310c that are actively driven. At any time in a 3-wire implementation, exactly two of the signal wires 310a, 310b, 310c are driven with currents in opposite directions and/or with a voltage differential. In one implementation, data may be encoded using two bit values 412, where one bit is encoded in the direction of phase transitions 410 and the second bit is encoded in the polarity 408 for the current state.

The timing diagram 400 illustrates data encoding using both phase rotation direction and polarity. The curves 402, 404 and 406 relate to signals carried on three signal wires 310a, 310b and 310c, respectively for multiple phase states. Initially, the phase transitions 410 are in a clockwise direction and the most significant bit is set to binary '1,' until the rotation of phase transitions 410 switches at a time 414 to a counterclockwise direction, as represented by a binary '0' of the most significant bit. The least significant bit reflects the polarity 408 of the signal in each state.

According to certain aspects disclosed herein, one bit of data may be encoded in the rotation, or phase change in a 3-phase encoding system, and an additional bit may be encoded in the polarity of the two driven wires. Additional information may be encoded in each transition of a 3-phase encoding system by allowing transition to any of the possible states from a current state. Given 3 rotational phases and two polarities for each phase, 6 states are available in a 3-phase encoding system. Accordingly, 5 states are available from any current state, and there may be $\log_2(5) \cong 2.32$ bits encoded per symbol (transition), which allows the mapper 302 to accept a 16-bit word and encode it in 7 symbols.

The general equation for the number of combinations of wires that can be driven for a bus of any size, as a function of the number of wires in the bus and number of wires simultaneously driven:

$$C(N_{wires}, N_{driven}) = \frac{N_{wires}!}{(N_{wires} - N_{driven})! \cdot N_{driven}!}$$

one equation for calculating the number of combinations of polarity for the wires being driven is:

$$C\left(N_{driven}, \frac{N_{driven}}{2}\right) = \frac{N_{driven}!}{\left(\left(\frac{N_{driven}}{2}\right)!\right)^2}$$

The equivalent number of bits per symbol may be stated as:

$$\log_2\left(C(N_{wires}, N_{driven}) \cdot C\left(N_{driven}, \frac{N_{driven}}{2}\right) - 1\right)$$

Figure 5:
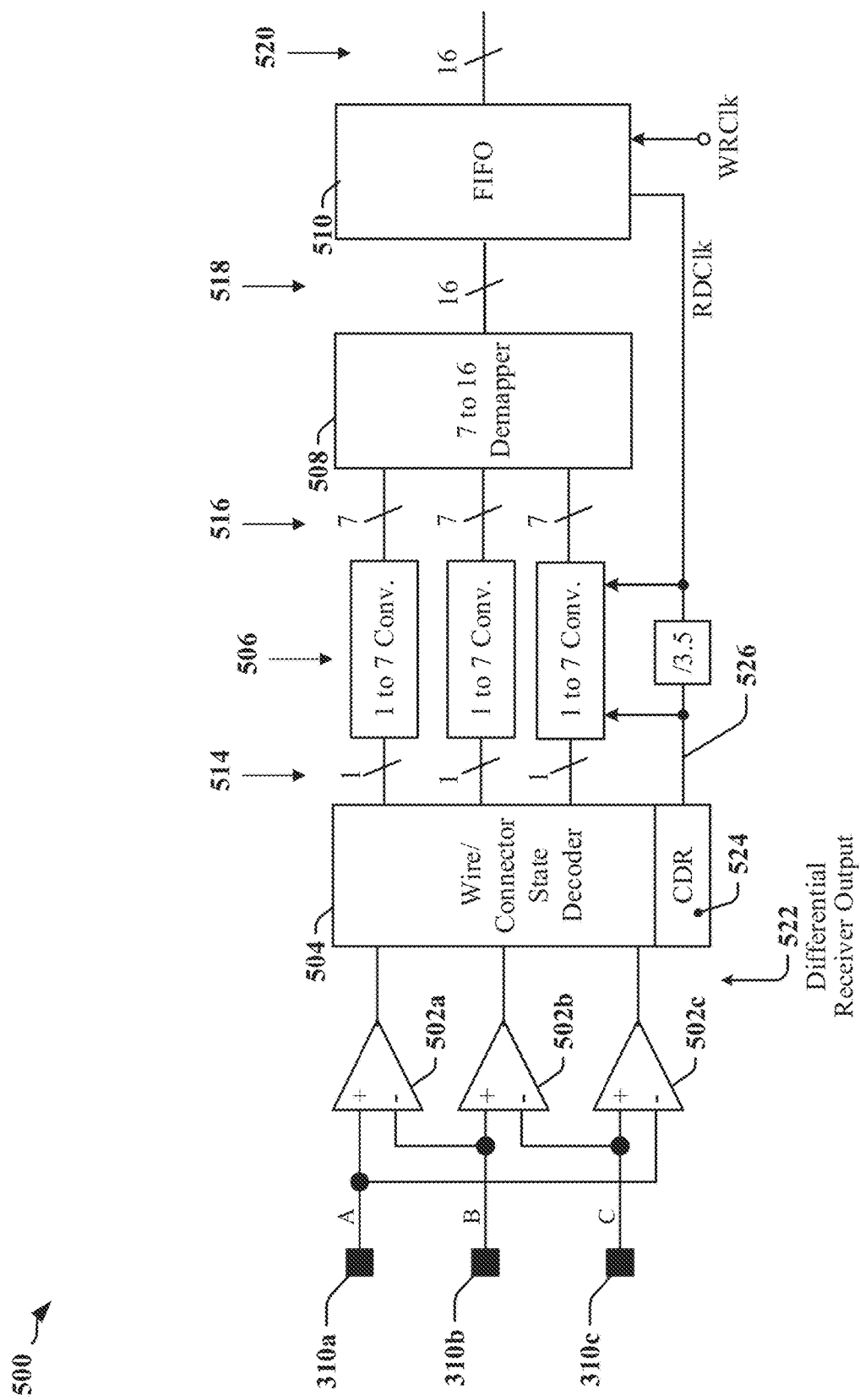
FIG. 5 illustrates a C-PHY decoder.

FIG. 5 is a diagram illustrating certain aspects of a C-PHY interface 500 in a receiving device. Differential receivers 502a, 502b, 502c and a wire state decoder 504 are configured to provide a digital representation of the state of the three transmission lines (e.g., the signal wires 310a, 310b and 310c illustrated in FIG. 3), with respect to one another, and to detect changes in the state of the three transmission lines compared to the state transmitted in the previous symbol period. Seven consecutive states are assembled by the serial-to-parallel convertors 506 to obtain a set of 7 symbols 516 to be processed by the demapper 508. The demapper 508 produces 16 bits of data 518 that may be buffered in a first-in-first-out (FIFO) register 510 that provides a decoded output 520.

The wire state decoder 504 may extract a sequence of symbols 514 from phase encoded signals received on the signal wires 310a, 310b and 310c. The symbols 514 are encoded as a combination of phase rotation and polarity as disclosed herein. The wire state decoder may include a CDR circuit 524 that extracts a clock 526 that can be used to reliably capture symbols from the signal wires 310a, 310b and 310c. A transition occurs on least one of the signal wires 310a, 310b and 310c at each symbol boundary and the CDR circuit 524 may be configured to generate the clock 526 based on the occurrence of a transition or multiple transitions. An edge of the clock may be delayed to allow time for all signal wires 310a, 310b and 310c to have stabilized and to thereby ensure that the current symbol is captured for decoding purposes.

Figure 6:
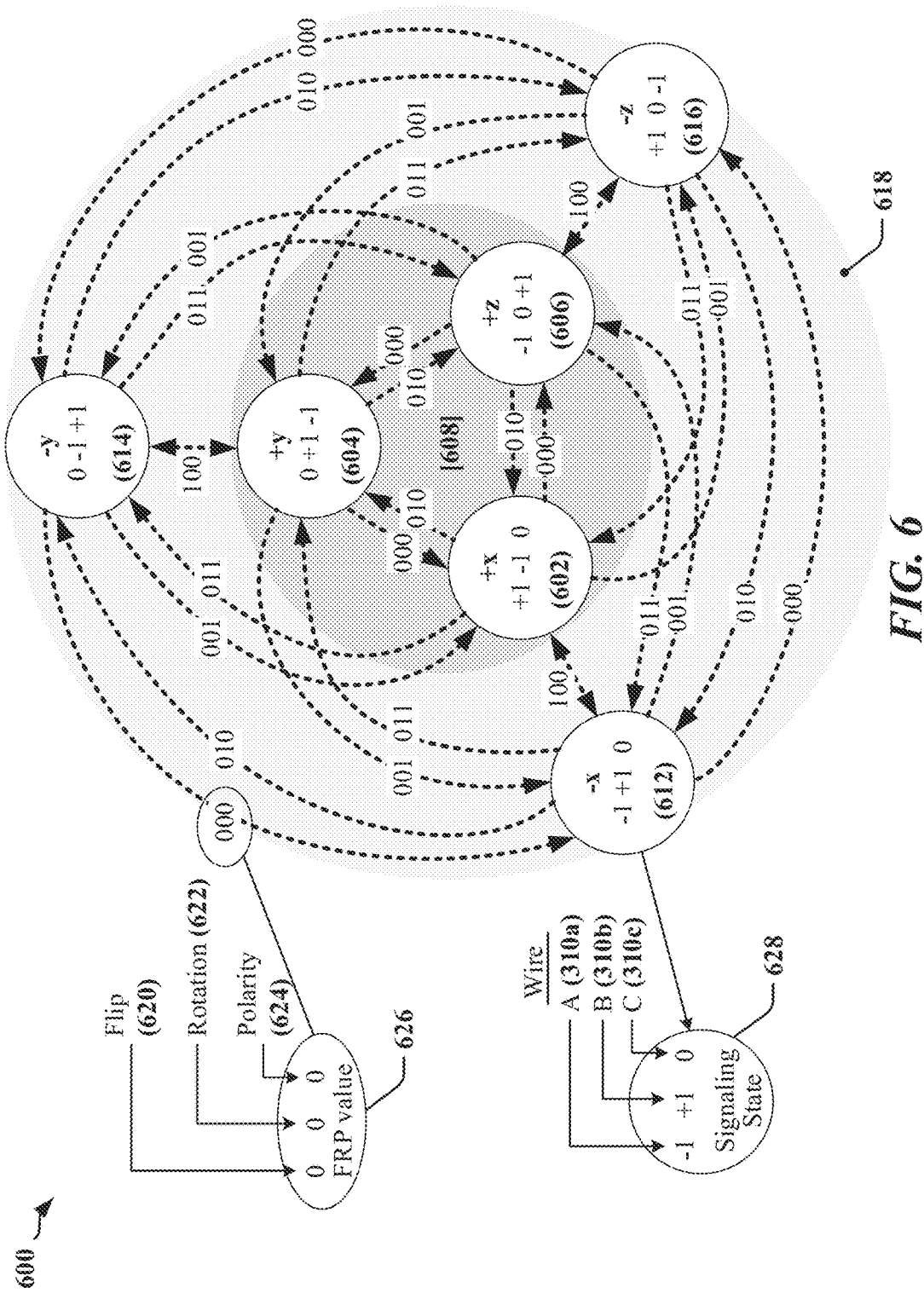
FIG. 6 is a state diagram illustrating potential state transitions in a C-PHY 3-phase encoded interface.

FIG. 6 is state diagram 600 illustrating the possible signaling states 602, 604, 606, 612, 614, 616 of the three wires, with the possible transitions illustrated from each state. In the example of a 3-wire, 3-phase communication link, 6 states and 30 state transitions are available. The possible states 602, 604, 606, 612, 614 and 616 in the state diagram 600 include and expand on the states shown in the circular state diagram 450 of FIG. 4. As shown in the exemplar of a state element 628, each state 602, 604, 606, 612, 614 and 616 in the state diagram 600 defines voltage signaling state of the signal wires 310a, 310b, 310c, which are labeled A, B and C respectively. For example, in state 602 (+x) wire A=+1, wire B=−1 and wire C=0, yielding output of differential receiver 602a (A-B)=+2, differential receiver 602b (B−C)=−1 and differential receiver 602c (C−A)=−1. Transition decisions taken by phase change detect circuits in a receiver are based on 5 possible levels produced by the differential receivers 502a, 502b, 502c, which include −2, −1, 0, +1 and +2 voltage states.

The transitions in the state diagram 600 can be represented by a Flip, Rotate, Polarity symbol (e.g., the FRP symbol 626) that has one of the three-bit binary values in the set: {000, 001, 010, 011, 100}. The Rotation bit 622 of the FRP symbol 626 indicates the direction of phase rotation associated with a transition to a next state. The Polarity bit 624 of the FRP symbol 626 is set to binary 1 when a transition to a next state involves a change in polarity. When the Flip bit 620 of the FRP symbol 626 is set to binary 1, the Rotate and Polarity values may be ignored and/or zeroed. A flip represents a state transition that involves only a change in polarity. Accordingly, the phase of a 3-phase signal is not considered to be rotating when a flip occurs and the polarity bit is redundant when a flip occurs. The FRP symbol 626 corresponds to wire state changes for each transition. The state diagram 600 may be separated into an inner circle 608 that includes the positive polarity states 602, 604, 606 and an outer circle 618 that encompasses the negative polarity states 612, 614, 616.

Jitter in 3-Phase Interfaces

A 3-phase transmitter includes drivers that provide high, low and middle-level voltages onto the transmit channel. This results in some variable transitions between consecutive symbol intervals. Low-to-high and high-to-low voltage transitions may be referred to as full-swing transitions, while low-to-middle and high-to-middle voltage transitions may be referred to as half-swing transitions. Different types of transitions may have different rise or fall times, and may result in different zero crossings at the receiver. These differences can result in "encoding jitter," which may impact link signal integrity performance.

Figure 7:
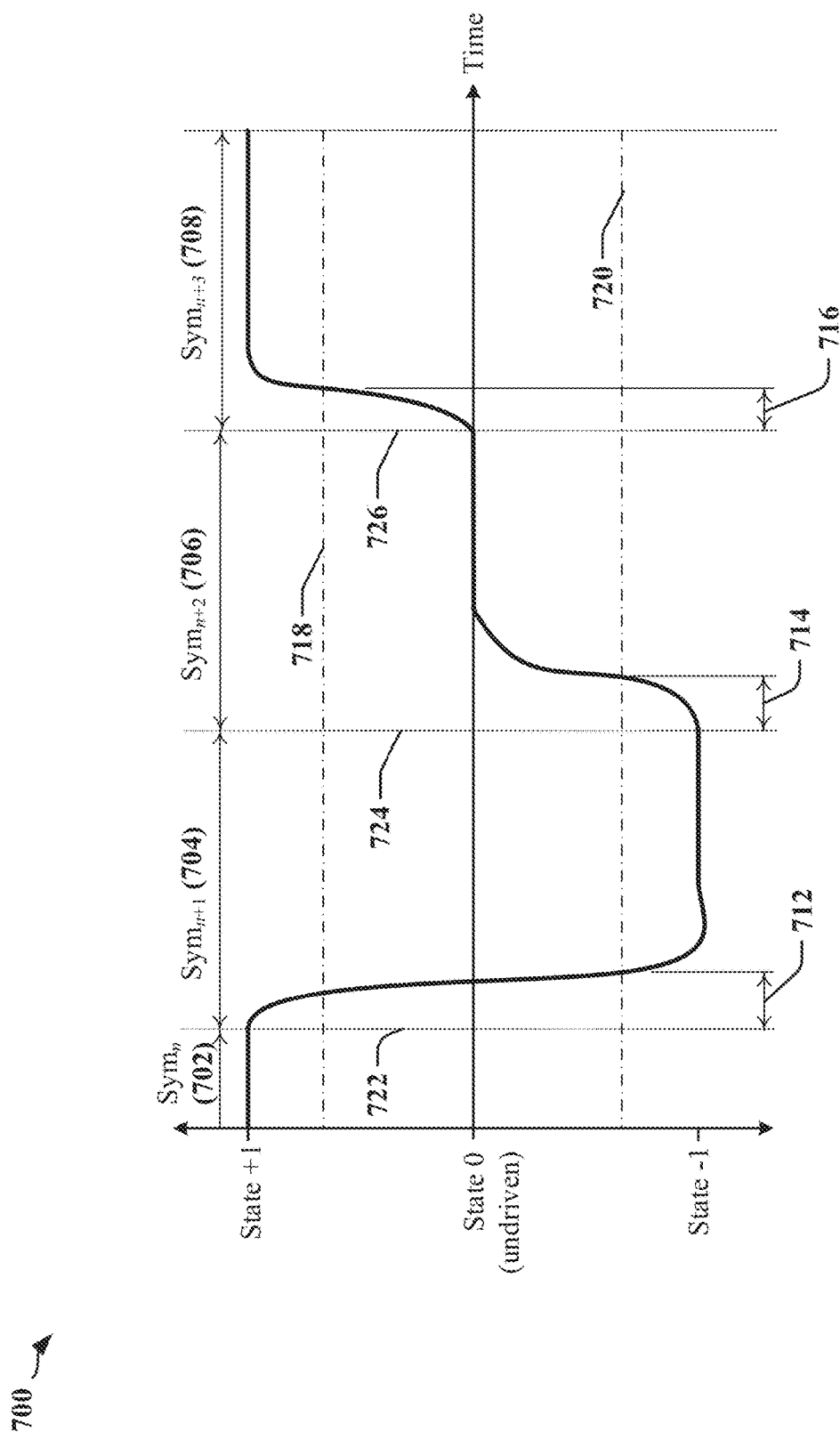
FIG. 7 is an example of the effects of signal rise times on transition detection in a C-PHY decoder.

FIG. 7 is a timing diagram 700 that illustrates certain aspects of transition variability at the output of a C-PHY 3-phase transmitter. Variability in signal transition times may be attributed to the existence of the different voltage and/or current levels used in 3-phase signaling. The timing diagram 700 illustrates transition times in a signal received from a single signal wire 310a, 310b or 310c. A first symbol $Sym_n$ 702 is transmitted in a first symbol interval that ends at a time 722 when a second symbol $Sym_1$ 724 is transmitted in a second symbol interval. The second symbol interval may end at time 726 when a third symbol $Sym_2$ 706 is transmitted in the third symbol interval, which ends when a fourth symbol $Sym_3$ 708 is transmitted in a fourth symbol interval. The transition from a state determined by the first symbol 702 to the state corresponding to the second symbol 704 may be detectable after a delay 712 attributable to the time taken for voltage in the signal wire 310a, 310b or 310c to reach a threshold voltage 718 and/or 720. The threshold voltages may be used to determine the state of the signal wire 310a, 310b or 310c. The transition from a state determined by the second symbol 704 to the state for the third symbol 706 may be detectable after a delay 714 attributable to the time taken for voltage in the signal wire 310a, 310b or 310c to reach one of the threshold voltages 718 and/or 720. The transition from a state determined by the third symbol 706 to the state for the fourth symbol 708 may be detectable after a delay 716 attributable to the time taken for voltage in the signal wire 310a, 310b or 310c to reach a threshold voltage 718 and/or 720. The delays 712, 714 and 716 may have different durations, which may be attributable in part to variations in device manufacturing processes and operational conditions, which may produce unequal effects on transitions between different voltage or current levels associated with the 3 states and/or different transition magnitudes. These differences may contribute to jitter and other issues in C-PHY 3-phase receiver.

Figure 8:
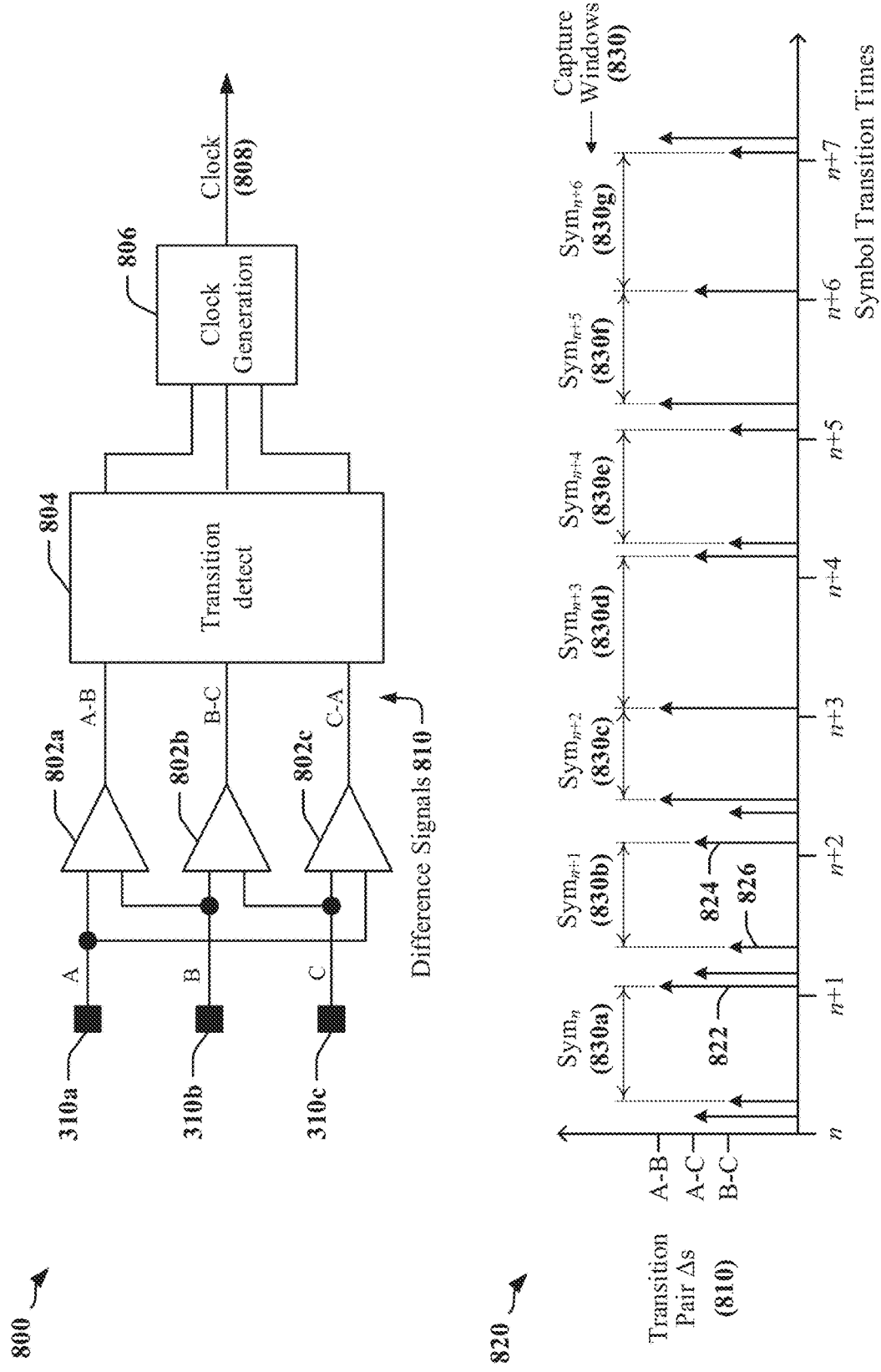
FIG. 8 illustrates transition detection in a C-PHY decoder.

FIG. 8 includes a block schematic 800 illustrating certain aspects of CDR circuits that may be provided in a receiver in a C-PHY 3-phase interface. A set of differential receivers 802a, 802b and 802c is configured to generate a set of difference signals 810 by comparing each of the three signal wires 310a, 310b and 310c in a trio with the other of the three signal wires 310a, 310b and 310c in the trio. In the example depicted, a first differential receiver 802a compares the states of signal wires 310a and 310b, a second differential receiver 802b compares the states of signal wires 310b and 310c and a third differential receiver 802c compares the states of signal wires 310a and 310c. Accordingly, a transition detection circuit 804 can be configured to detect occurrence of a phase change because the output of at least one of the differential receivers 802a, 802b and 802c changes at the end of each symbol interval.

Certain transitions between transmitted symbols may be detectable by a single differential receiver 802a, 802b or 802c, while other transitions may be detected by two or more of the differential receivers 802a, 802b and 802c. In one example the states, or relative states of two wires may be unchanged after a transition and the output of a corresponding differential receiver 802a, 802b or 802c may also be unchanged after the phase transition. In another example, both wires in a pair of signal wires 310a, 310b and/or 310c may be in the same state in a first time interval and both wires may be in a same second state in a second time interval and the corresponding differential receiver 802a, 802b or 802c may be unchanged after the phase transition. Accordingly, a clock generation circuit 806 may include a transition detection circuit 804 and/or other logic to monitor the outputs of all differential receivers 802a, 802b and 802c in order to determine when a phase transition has occurred. The clock generation circuit may generate a receive clock signal 808 based on detected phase transitions.

Changes in signaling states of the 3 wires may be detected at different times for different combinations of the signal wires 310a, 310b and/or 310c. The timing of detection of signaling state changes may vary according to the type of signaling state change that has occurred. The result of such variability is illustrated in the timing diagram 820 of FIG. 8. Markers 822, 824 and 826 represent occurrences of transitions in the difference signals 810 provided to the transition detection circuit 804. The markers 822, 824 and 826 are assigned different heights in the timing diagram 820 for clarity of illustration only, and the relative heights of the markers 822, 824 and 826 are not intended to show a specific relationship to voltage or current levels, polarity or weighting values used for clock generation or data decoding. The timing diagram 820 illustrates the effect of timing of transitions associated with symbols transmitted in phase and polarity on the three signal wires 310a, 310b and 310c. In the timing diagram 820, transitions between some symbols may result in variable capture windows 830a, 830b, 830c, 830d, 830e, 830f and/or 830g (collectively symbol capture windows 830) during which symbols may be reliably captured. The number of state changes detected, and their relative timing can result in jitter on the clock signal 808.

The throughput of a C-PHY communications link may be affected by duration and variability in signal transition times. For example, variability in detection circuits may be caused by manufacturing process tolerances, variations and stability of voltage and current sources and operating temperature, as well as by the electrical characteristics of the signal wires 310a, 310b and 310c. The variability in detection circuits may limit channel bandwidth.

Figure 9:
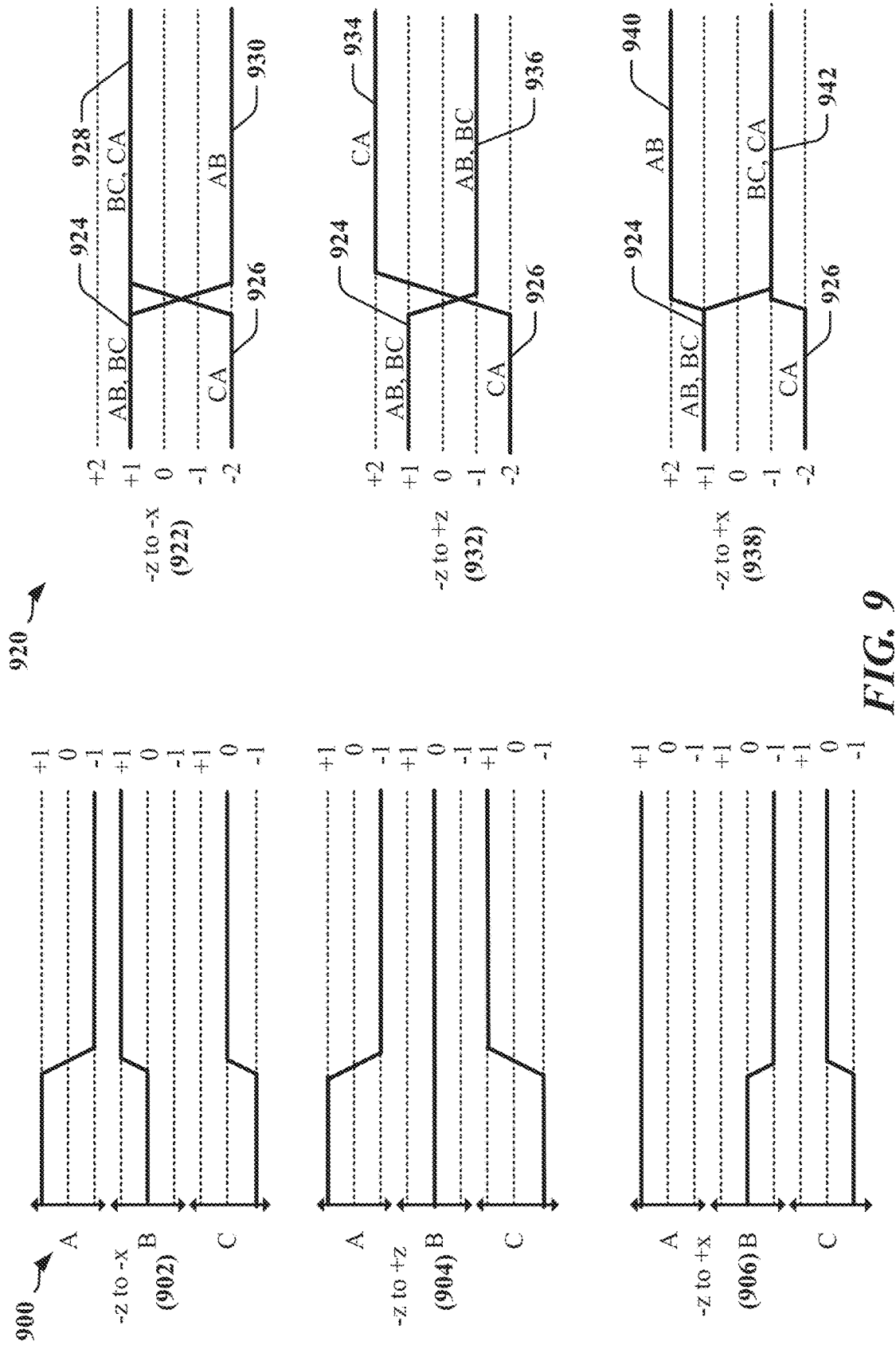
FIG. 9 illustrates one example of signal transitions occurring between pairs of consecutive symbols transmitted on a C-PHY interface.

FIG. 9 includes timing diagrams 900 and 920 representative of certain examples of transitions from a first signaling state to a second signaling state between certain consecutive symbols. The signaling state transitions illustrated in the timing diagrams 900 and 920 are selected for illustrative purposes, and other transitions and combinations of transitions can occur in a 3-phase signaling interface, including in the MIPI Alliance C-PHY interface. The timing diagrams 900 and 920 relate to an example of a 3-wire, 3-phase communications link, in which multiple receiver output transitions may occur at each symbol interval boundary due to differences in rise and fall time between the signal levels on the trio of wires. With reference also to FIG. 8, the first timing diagrams 900 illustrate the signaling states of the trio of signal wires 310a, 310b and 310c (A, B, and C) before and after a transition and the second timing diagram 920 illustrates the outputs of the differential receivers 802a, 802b and 802c, which provides difference signals 810 representative of the differences between signal wires 310a, 310b and 310c. In many instances, a set of differential receivers 802a, 802b and 802c may be configured to capture transitions by comparing different combinations for two signal wires 310a, 310b and 310c. In one example, these differential receivers 802a, 802b and 802c may be configured to produce outputs by determining the difference (e.g. by subtraction) of their respective input voltages.

In each of the examples shown in the timing diagrams 900 and 920, the initial state 616 (symbol −z) (see FIG. 6) transitions to a different symbol. As shown in the timing diagrams 902, 904 and 906 signal A is initially in a +1 state, signal B is in a 0 state and signal C is in the −1 state. Accordingly, the differential receivers 802a, 802b initially measure a +1 difference 924 and the differential receiver 802c measures a −2 difference 926, as shown in the timing diagrams 922, 932, 938 for the differential receiver outputs.

In a first example corresponding to the timing diagrams 902, 922, a transition occurs from the initial state 616 (symbol −z) to a next state 612 (symbol −x) in which signal A transitions to a −1 state, signal B transitions to a +1 state and signal C transitions to a 0 state, with the differential receiver 802a transitioning from +1 difference 924 to a −2 difference 930, differential receiver 802b remaining at a +1 difference 924, 928 and differential receiver 802c transitioning from −2 difference 926 to a +1 difference 928.

In a second example corresponding to the timing diagrams 904, 932, a transition occurs from the initial state 616 (symbol −z) to a next state 606 (symbol +z) in which signal A transitions to a −1 state, signal B remains at the 0 state and signal C transitions to a +1 state, with two differential receivers 802a and 802b transitioning from +1 difference 924 to a −1 difference 936, and differential receiver 802c transitioning from −2 difference 926 to a +2 difference 934.

In a third example corresponding to the timing diagrams 906, 938, a transition occurs from the initial state 616 (symbol −z) to a next state 602 (symbol +x) in which signal A remains at the +1 state, signal B transitions to the −1 state and signal C transitions to a 0 state, with the differential receiver 802a transitioning from a +1 difference 924 to a +2 difference 940, the differential receiver 802b transitioning from a +1 difference 924 to a −1 difference 942, and the differential receiver 802c transitioning from −2 difference 926 to a −1 difference 942.

These examples illustrate transitions in difference values spanning 0, 1, 2, 3, 4 and 5 levels. Pre-emphasis techniques used for typical differential or single-ended serial transmitters were developed for two level transitions and may introduce certain adverse effects if used on a MIPI Alliance C-PHY 3-phase signal. In particular, a pre-emphasis circuit that overdrives a signal during transitions may cause overshoot during transitions spanning 1 or 2 levels and may cause false triggers to occur in edge sensitive circuits.

Figure 10:
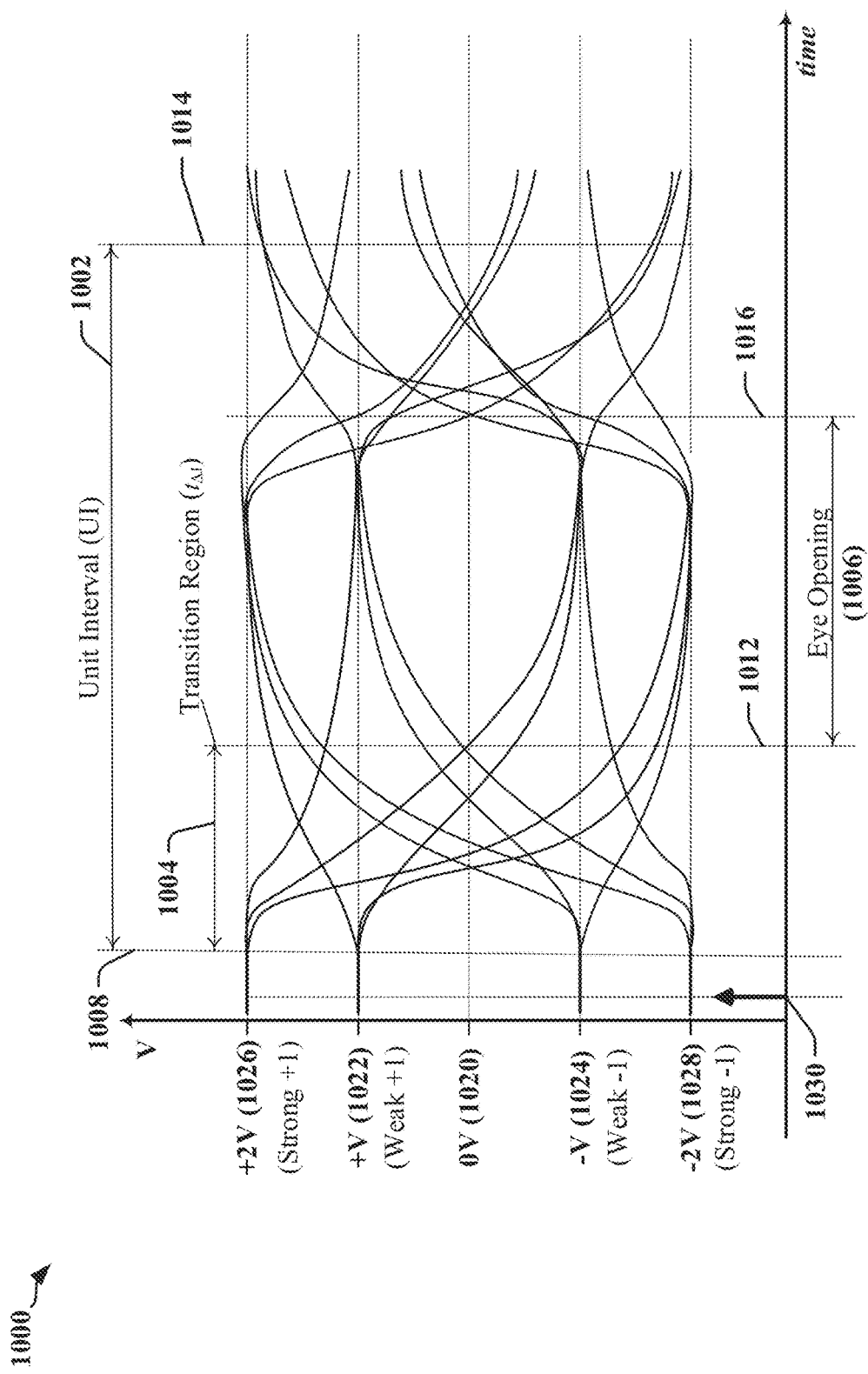
FIG. 10 illustrates an example of an eye-diagram generated for a C-PHY 3-Phase interface.

FIG. 10 illustrates an example of an eye-diagram 1000 generated for 3-phase signals. The eye-diagram 1000 may be generated from an overlay of multiple symbol intervals 1002. The eye-diagram 1000 may be produced using a fixed and/or symbol-independent trigger 1030. The eye-diagram 1000 includes an increased number of voltage levels 1020, 1022, 1024, 1026, 1028 that may be attributed to the multiple voltage levels measured by the differential receivers 802a, 802b, 802c an N-phase receiver circuit (see FIG. 8). In the example, the eye-diagram 1000 may correspond to possible transitions in 3-phase encoded signals produced by line drivers 308 308 of a C-PHY interface 300 in a transmitter coupled to a trio of signal wires 310a, 310b and 310c. The 3-phase encoded signals may be received at the differential receivers 502a, 502b, 502c in a C-PHY interface 500 of a receiving device. In the case where the trio of signal wires 310a, 310b and 310c does not impose significant attenuation, the three voltage levels of the 3-phase encoded signals may cause the differential receivers 502a, 502b, 502c to generate strong voltage levels 1026, 1028 and weak voltage levels 1022, 1024 for both positive and negative polarities. The signal wires 310a, 310b and 310c are in three different states for every symbol and the differential receivers 502a, 502b, 502c do not produce a null, center or mid-level state (here, 0 Volts) in their respective outputs after transitions have been completed. The voltages associated with strong and weak levels need not be evenly spaced with respect to the null, center or mid-level state. The weak voltage levels 1022, 1024 represent a comparison of voltages that may include the voltage level reached by an undriven signal wire 310a, 310b and 310c. The eye-diagram 1000 may overlap the waveforms produced by the differential receivers 502a, 502b, 502c because all three pairs of signals are considered simultaneously when data is captured at the receiving device. The waveforms produced by the differential receivers 502a, 502b, 502c are representative of difference signals 810 representing comparisons of three pairs of signals (A-B, B-C, and C-A).

Drivers, receivers and other devices used in a C-PHY 3-Phase decoder may exhibit different switching characteristics that can introduce relative delays between signals received from the three wires. Multiple receiver output transitions may be observed at each symbol interval boundary 1008 and/or 1014 due to slight differences in the rise and fall time between the three signals of the trio of signal wires 310a, 310b, 310c and due to slight differences in signal propagation times between the combinations of pairs of signals received from the signal wires 310a, 310b, 310c. The eye-diagram 1000 may capture variances in rise and fall times as a relative delay in transitions near each symbol interval boundary 1008 and 1014. The variances in rise and fall times may be due to the different characteristics of the 3-phase drivers. Differences in rise and fall times may also result in an effective shortening or lengthening of the duration of the symbol interval 1002 for any given symbol.

A signal transition region 1004 represents a time, or period of uncertainty, where variable signal rise times prevent reliable decoding. State information may be reliably determined in an "eye opening" 1006 representing the time period in which the symbol is stable and can be reliably received and decoded. In one example, the eye opening 1006 may be determined to begin at the end 1012 of the signal transition region 1004, and end at the symbol interval boundary 1014 of the symbol interval 1002. In the example depicted in FIG. 10, the eye opening 1006 may be determined to begin at the end 1012 of the signal transition region 1004, and end at a time 1016 when the signaling state of the signal wires 310a, 310b, 310c and/or the outputs of the three differential receivers 502a, 502b, 502c have begun to change to reflect the next symbol.

The maximum speed of a communication link 220 configured for N-Phase encoding may be limited by the duration of the signal transition region 1004 compared to the eye opening 1006 corresponding to the received signal. The minimum period for the symbol interval 1002 may be constrained by tightened design margins associated with the CDR circuit 524 in the C-PHY interface 500 illustrated in FIG. 5, for example. Different signaling state transitions may be associated with different variations in attenuation and/or signal transition times corresponding to two or more signal wires 310a, 310b and/or 310c, thereby causing the outputs of the differential receivers 502a, 502b, 502c in the receiving device to change at different times and/or rates with respect to the symbol interval boundary 1008, where the inputs of the differential receivers 502a, 502b, 502c begin to change. The differences between signal transition times may result in timing skews between signaling transitions in two or more difference signals 522.

Figure 11:
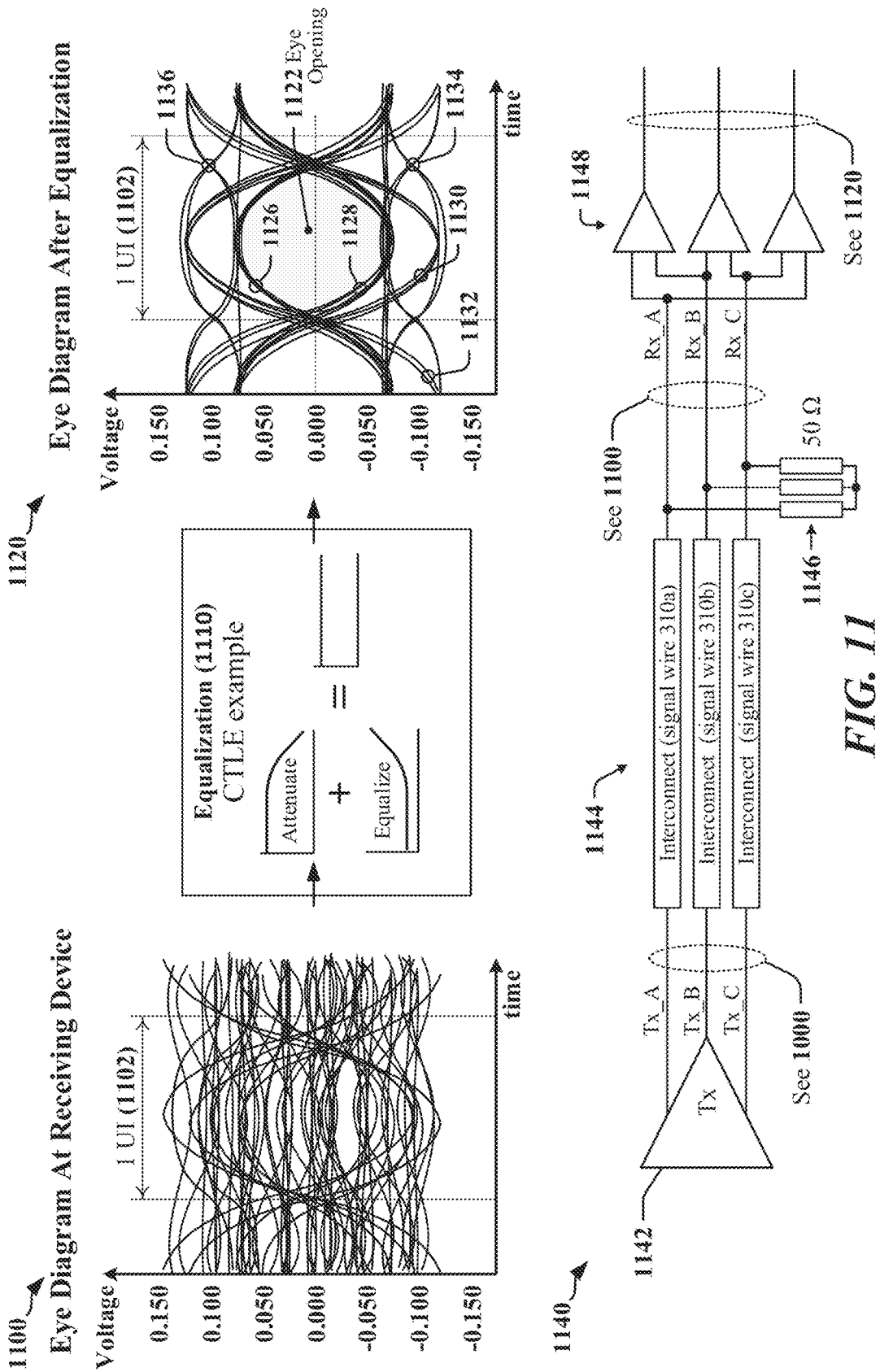
FIG. 11 illustrates the effects of attenuation and counter-acting equalization in a C-PHY interface.

Signal attenuation may contribute significantly to timing skews and voltage levels of 3-phase encoded signals at the differential receivers 502a, 502b, 502c. FIG. 11 illustrates the effects of attenuation and counteracting equalization in a C-PHY interface 1140. A transmitting device includes a 3-phase line driver circuit 1142 is coupled to equalizing differential receivers 1148 through an interconnect 1144 that includes a trio of signal wires 310a, 310b, 310c that may be characterized and/or terminated by 50 ohm impedances 1146. In one example, certain characteristics of the output of the line driver circuit 1142 may be represented by the eye-diagram 1000 in FIG. 10, certain characteristics of the transmitted signals after attenuation by the interconnect 1144 may be represented by the first eye-diagram 1100 in FIG. 11, and certain characteristics of ideal or optimally equalized signals output by the equalizing differential receivers 1148 may be represented by the second eye-diagram 1120 in FIG. 11.

When an electrical signal is transmitted through the interconnection 1144, high-frequency components may be lost or attenuated to a greater extent than lower frequencies because of the characteristics of the interconnection medium, the effect of termination, and for other reasons. High-frequency losses can result in significant distortion in the signals received by the equalizing differential receivers 1148. Signal distortion increases with transmission clock frequency, and can result in slowed transitions, and can affect the differences in amplitude of signals detected by the equalizing differential receivers 1148, as illustrated in the first eye-diagram 1100 of FIG. 11. Non-equalizing receivers, or poorly optimized equalizing differential receivers 1148 may be unable to sense the proper signal and may result in erroneous decoding of transmitted 3-phase signals.

Equalizing differential receivers 1148 may implement channel equalization using high-pass filters to compensate for high frequency losses. Differential signals may be equalized using continuous time linear equalization (CTLE 1110) and/or decision feedback equalization (DFE). CTLE 1110 employs filters that attenuate low-frequency signal components and amplify higher-frequency response. Logic and/or symbol decisions are summed and provided as feedback to the symbol decoder (slicer) in DFE. The optimal configurations of CTLE 1110 and/or DFE may depend on the interconnection medium, and can be different in different implementations. In some examples, optimal configuration involves selecting a ratio of low frequency attenuation to high frequency amplification. The 3-phase signal transmitted over the 3-wire C-PHY serial link may be difficult to equalize using conventional techniques due to the different types of transitions and different signaling states.

Each of the eye-diagrams 1100, 1100, 1120 covers a symbol or unit interval (UI 1002, 1102). An objective of equalization is to maximize the eye opening 1122 that represents the region in which reliable symbol decoding can be accomplished. The eye opening 1122 is defined by time and amplitude. The width of the eye opening 1122 in the second eye-diagram 1120 in FIG. 11, representing optimally equalized signals, can be affected by differences in rise times of certain signals 1126, 1128, 1130, 1132, including transitions between one of the two high voltage states and one of the two low voltage states. Differences can be introduced or exacerbated by high-frequency attenuation in the interconnection 1144. The height of the eye opening 1122 in the second eye-diagram 1120 in FIG. 11 represents optimally equalized signals, and is affected by differences in voltage levels associated with transitions in certain signals 1126, 1128, 1130, 1132, 1134, 1136. Signals 1134 that transition between the two low voltage states and signals 1136 that transition between the two high voltage states may include less high-frequency energy than signals 1126, 1128, 1130, 1132 which transition between one of the two high voltage states and one of the two low voltage states. Differences in signaling states associated with transitions in these signals 1126, 1128, 1130, 1132, 1134, 1136 can be introduced or exacerbated by the frequency-dependent amplification or attenuation applied during equalization. In some instances, equalization that obtains optimized transition timing in these signals 1126, 1128, 1130, 1132, 1134, 1136 may result in a loss of height (voltage difference) of the eye opening 1122.

According to certain aspects disclosed herein, equalization circuits may be automatically optimized using one or more signaling patterns transmitted on the interconnection 1144. In one example, the patterns may produce signals that are subject to the worst case losses for a 3-phase signal.

Figure 12:
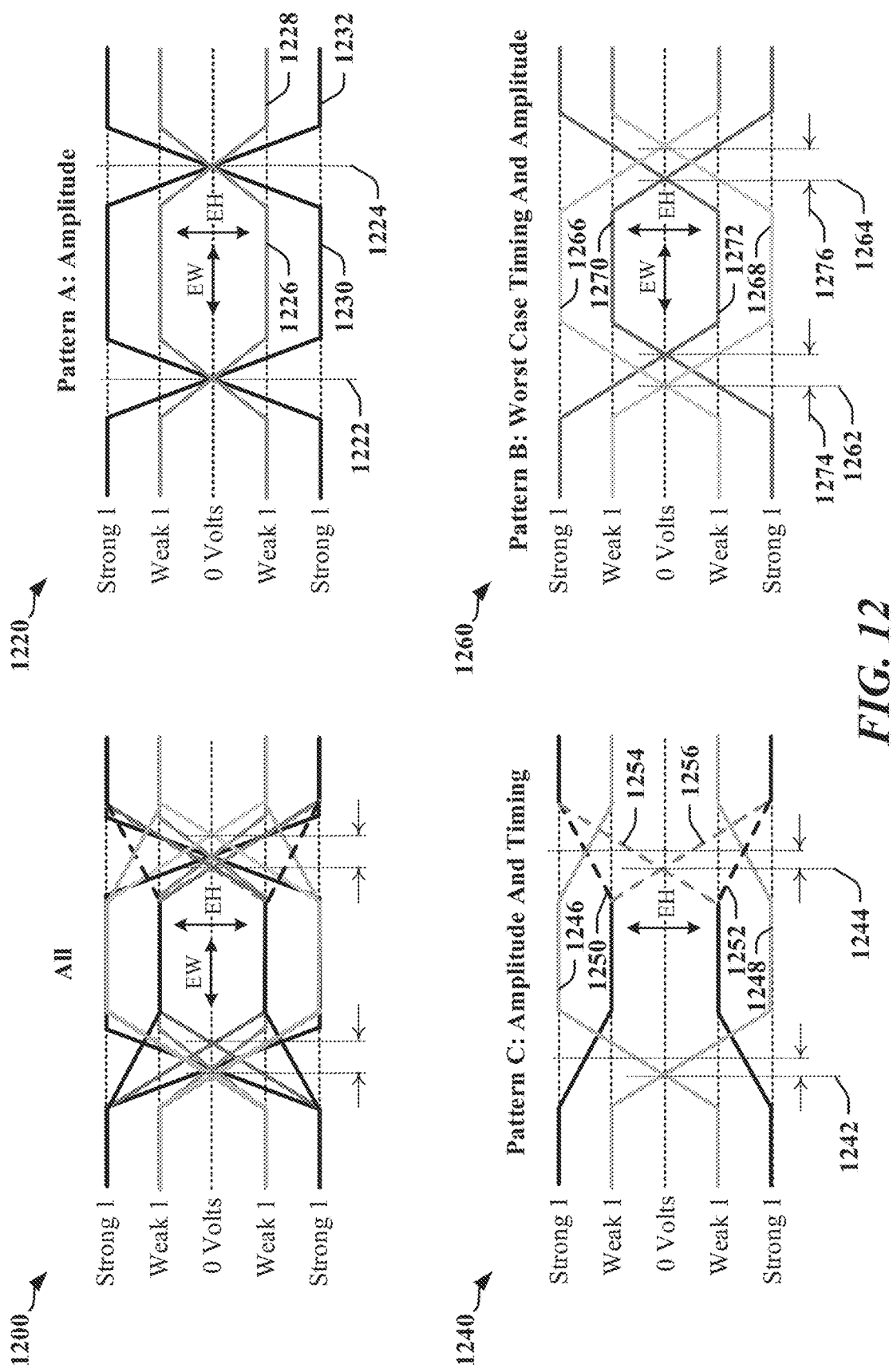
FIG. 12 illustrates certain aspects of an eye-diagram representing optimally equalized signals at the output of the equalizing differential receivers.

FIG. 12 illustrates certain aspects of the eye-diagram 1120 representing optimally equalized signals at the output of the equalizing differential receivers 1148. Each pattern in the eye-diagram 1120 is represented in the first pattern diagram 1200 of FIG. 12. The second eye-diagram 1220 of FIG. 12 includes combinations of transitions that are less susceptible to timing jitter. At each symbol transition 1222, 1224 four signals 1226, 1228, 1230, 1232 change state. Two signals 1226, 1228 transition between weak high voltage and weak low voltage, and two signals 1230, 1232 transition between strong high voltage and strong low voltage. As a result, the zero crossings for all four signals 1226, 1228, 1230, 1232 occur in close proximity. The second eye-diagram 1220 may be used to monitor the effect of equalization on voltage amplitudes.

The third eye-diagram 1240 of FIG. 12 includes combinations of transitions that are less susceptible to timing jitter. At a first symbol transition 1242, two signals 1246, 1248 have zero crossings, and two other signals 1254, 1256 have zero crossings at a second symbol transition 1244. The zero crossings occur in signals that transition from weak low-voltage to strong high-voltage or weak high-voltage to strong low-voltage, and no timing jitter is expected. At the first symbol transition 1242, four signals 1250, 1252, 1254, 1256 transition from the strong voltage state to the weak voltage state of the same polarity, while at the second symbol transition 1244, two signals 1246, 1248 transition from the strong voltage state to the weak voltage state of the same polarity, and two signals 1250, 1252 transition from the weak voltage state to the strong voltage state of the same polarity. The third eye-diagram 1240 may be used to monitor the effect of equalization on voltage amplitudes when different voltage step transitions are present, and timing when different transitions start at different weak polarity states.

The fourth eye-diagram 1260 of FIG. 12 includes combinations of transitions that provide worst case timing jitter 1274, 1276 and amplitude challenges. All four signals that have zero crossings at both symbol transitions 1262, 1264. At the first symbol transition 1262 two signals 1266, 1268 transition from the weak voltage state of one polarity to the strong voltage state of the other polarity while two signals 1270, 1272 transition from the strong voltage state of one polarity to the weak voltage state of the other polarity. At the second symbol transition 1264 two signals 1270, 1272 transition from the weak voltage state of one polarity to the strong voltage state of the other polarity while two signals 1266, 1268 transition from the strong voltage state of one polarity to the weak voltage state of the other polarity. The differences in starting voltage at each symbol transition 1242, 1244 may result in different zero crossings. All four signaling states can occur at the outputs of the equalizing differential receivers 1148 at each symbol transition 1242, 1244. The fourth eye-diagram 1260 may be used to monitor the effect of equalization on voltage amplitudes when different voltage step transitions are present, and timing when different transitions start at different weak polarity states.

Figure 13:
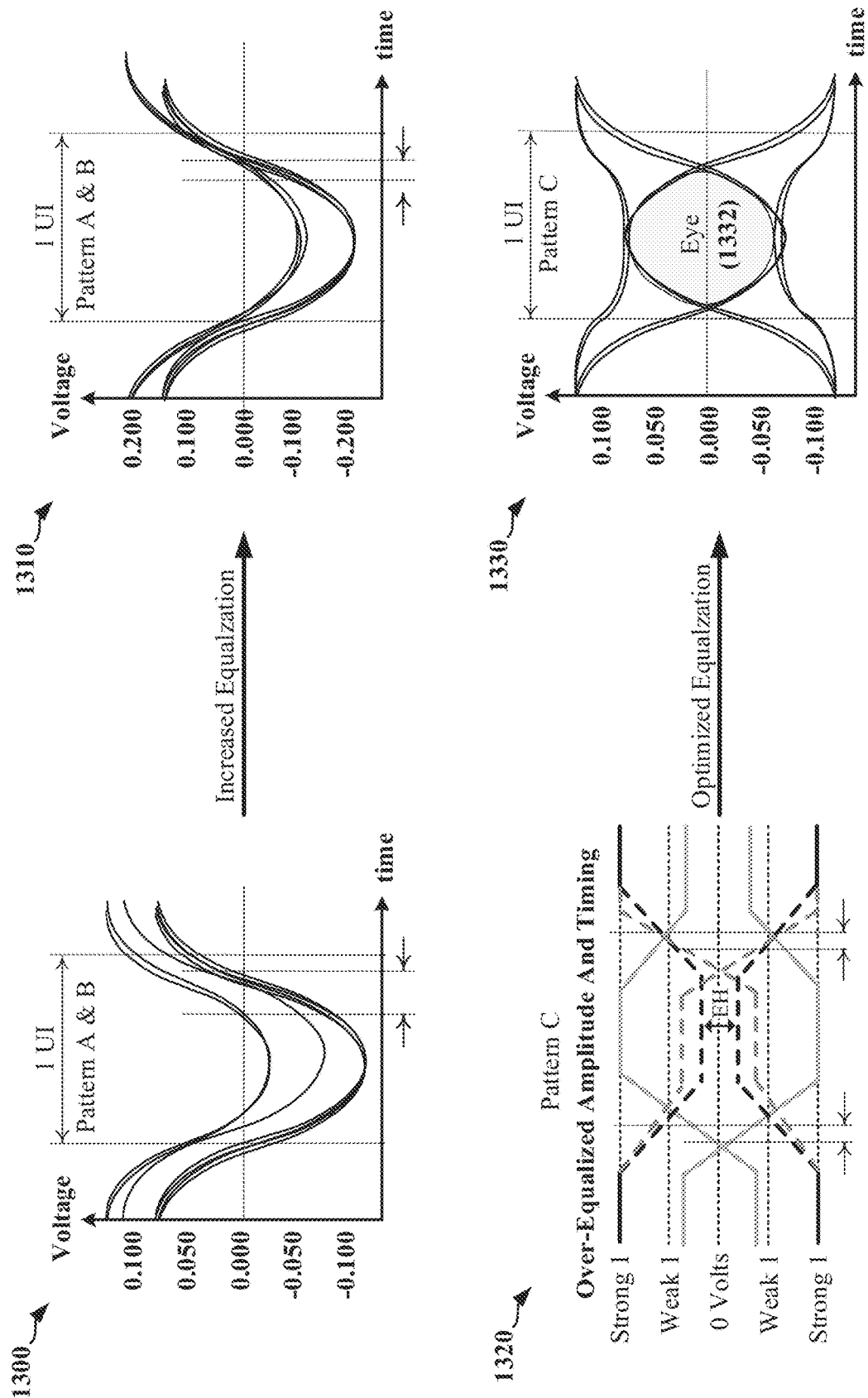
FIG. 13 illustrates certain examples of equalization in a C-PHY interface.

FIG. 13 illustrates certain examples of equalization in a C-PHY interface. The first example 1300 illustrates an equalized output of one of the equalizing differential receivers 1148, while the second example 1310 illustrates the output after increased equalization. The pattern transmitted over the interconnection 1144 may correspond to the second eye-diagram 1220 of FIG. 12 or the fourth eye-diagram 1260 of FIG. 12, where timing jitter predominates. The third example 1320 illustrates an over-equalized output of one of the equalizing differential receivers 1148 when the pattern transmitted over the interconnection 1144 corresponds to the third eye-diagram 1240 of FIG. 12, while the fourth example 1330 illustrates the output when equalization is reduced. By reducing equalization, less than ideal jitter and/or amplitude differentiation may be obtained, but the compromise may enable reliable decoding of the symbols transmitted over the interconnection 1144.

Figure 14:
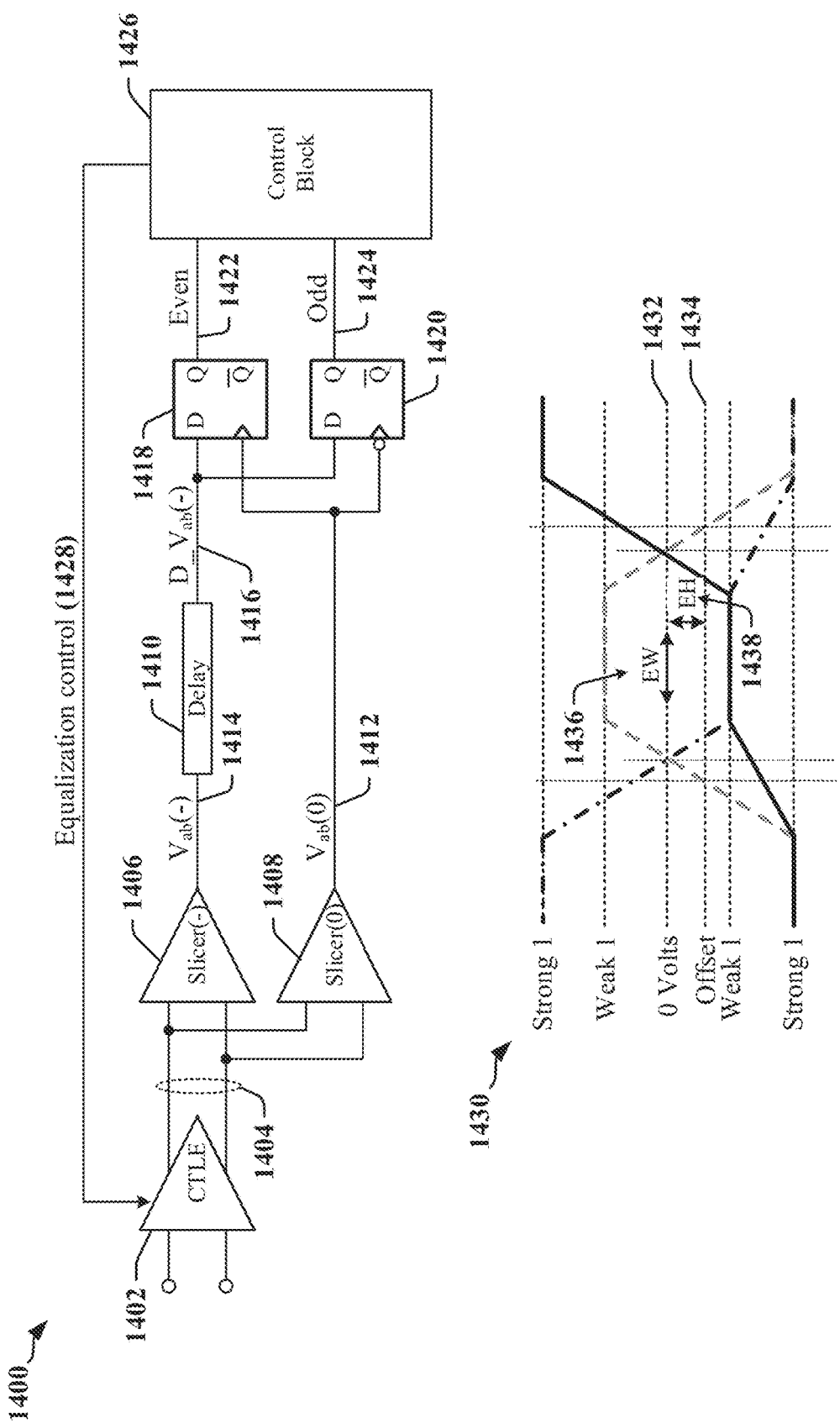
FIG. 14 illustrates an equalizing differential receiver in accordance with certain aspects disclosed herein.

FIG. 14 illustrates an equalizing differential receiver 1400 that may be adapted in accordance with certain aspects disclosed herein to automatically select a compromise equalization configuration in response to a pattern transmitted over a C-PHY communication link. In one example, the equalizing differential receiver 1400 may be implemented using a logic circuit and/or a processing circuit that includes a CTLE 1402 and a state machine, a digital signal processor, and/or another type of processor. In one example, the CTLE 1402 may be provided in one of the three differential receivers 502a, 502b, 502c in FIG. 5. An equalization control signal 1428 provided to the CTLE 1402 may be configured by feedback provided by a control block 1426 to provide equalization settings for one or more equalizing filters in the CTLE 1402.

The differential difference signal 1404 output by the CTLE 1402 may be provided to slicers 1406, 1408, each of which may incorporate or be part of a symbol decoder. A first slicer 1406 is configured for a negative offset 1434, while the second slicer 1408 is configured for a zero offset 1432. The single-ended difference signal 1414 produced by a first slicer 1406 may be delayed using a programmable delay circuit 1410 to obtain a delayed difference signal 1416 that is provided as a single-ended input to two bi-stable devices. For the purposes of this description, a bi-stable device may be defined as a switch, register, flipflop or other logic device that provides an output signal that can assume and hold one of two possible binary states, including '0' and '1', on and off, and/or high-voltage state and low-voltage state. The bi-stable devices disclosed herein may be implemented as latches, registers or, as illustrated in FIG. 14, flipflops 1418, 1420. The flipflops 1418, 1420 are clocked on opposite edges of a single-ended difference signal 1412 produced by the second slicer 1408. The first flipflop 1418 produces an output referred to as the Even signal 1422, while the second flipflop 1420 produces an output referred to as the Odd signal 1424. The control block 1426 evaluates equalization state of the CTLE 1402 based on a comparison of the Even signal 1422 and the Odd signal 1424.

The difference signal 1404 output by the CTLE 1402 may be under-equalized when, for example, the Even signal 1422 and the Odd signal 1424 are both at logic zero. When the CTLE 1402 is providing adequate equalization, providing sufficient eye width 1436 and eye height 1438 in the eye-diagram 1430, then the Even signal 1422 may be at logic zero while the Odd signal 1424 is at logic one. The Even signal 1422 is at logic zero when a positive transition occurs on the difference signal 1412 produced by the second slicer 1408 before the delayed difference signal 1416 transitions to logic one. The timing difference between the positive transition on the difference signal 1414 and the corresponding transition in the difference signal 1412 produced by the second slicer 1408 may be controlled by the value of the negative offset 1434 and the delay value provided by the programmable delay circuit 1410.

The Odd signal 1424 is at logic one when a negative transition occurs on the difference signal 1412 produced by the second slicer 1408 before the delayed difference signal 1416 transitions to logic zero. The timing difference between the negative transition on the difference signal 1412 and the corresponding transition in the difference signal 1412 produced by the second slicer 1408 may be controlled by the value of the negative offset 1434 and the delay value provided by the programmable delay circuit 1410.

Figure 15:
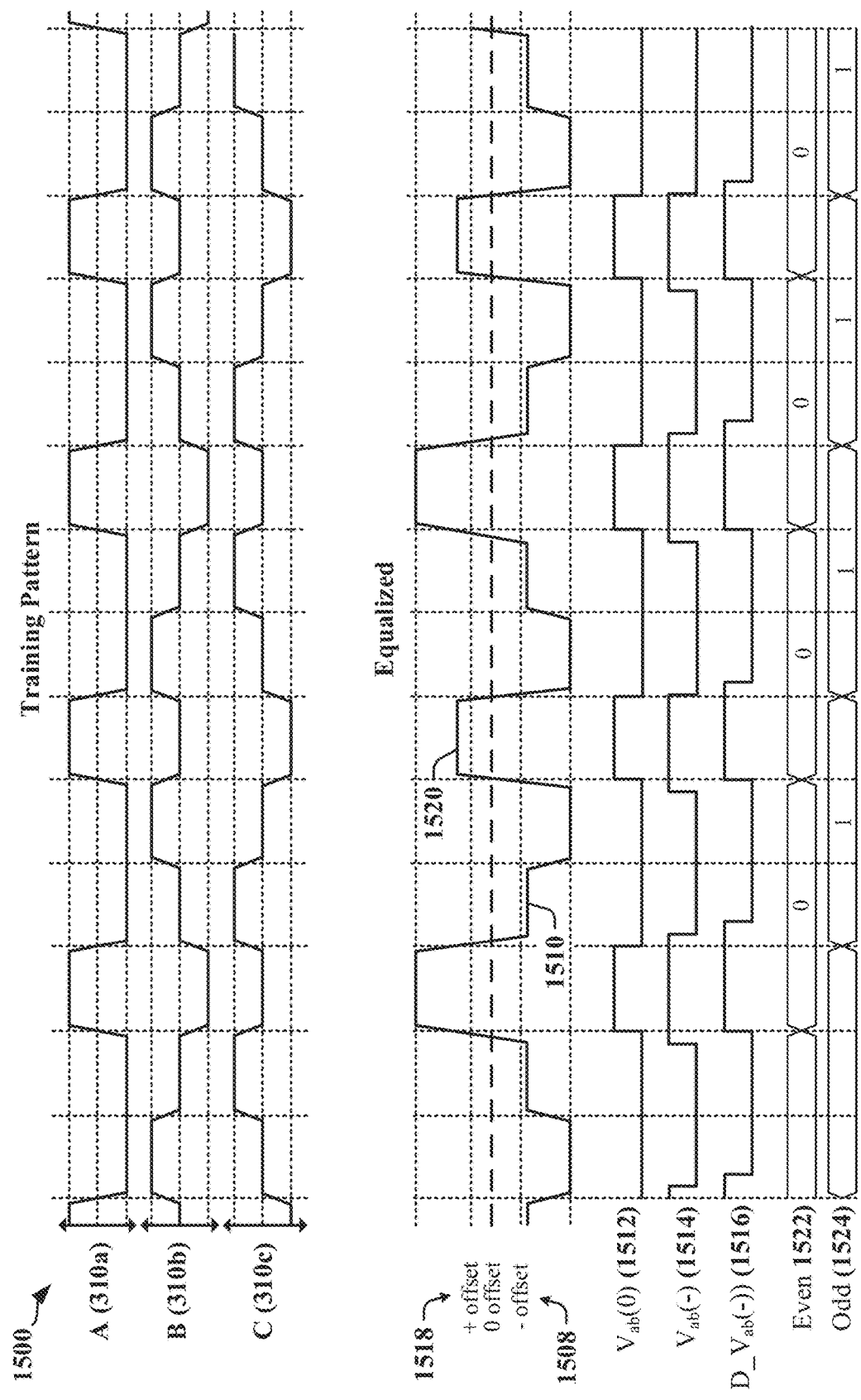
FIG. 15 illustrates a first example of the use of a training pattern to calibrate an equalizing differential receiver in accordance with certain aspects disclosed herein.
Figure 16:
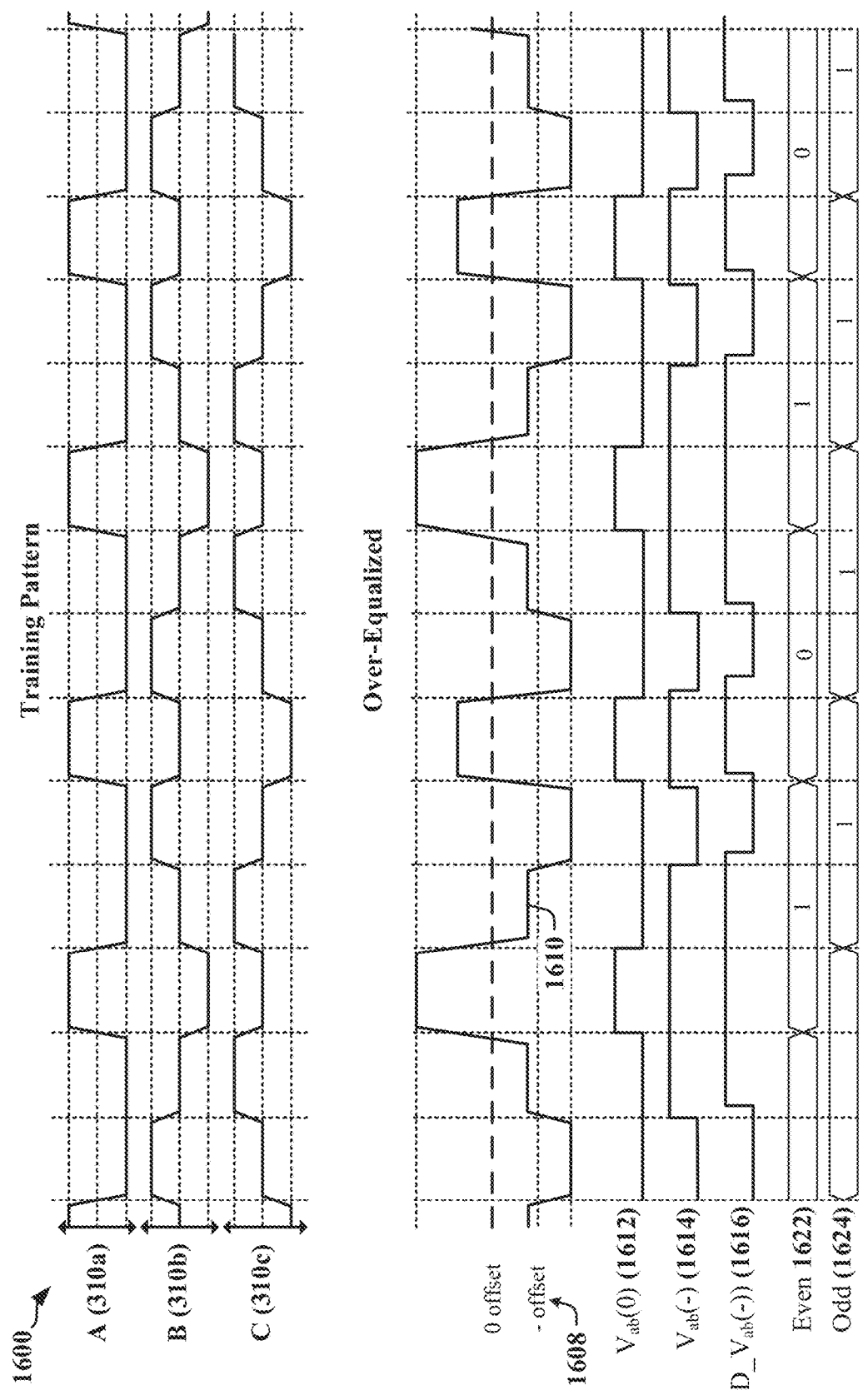
FIG. 16 illustrates a second example of the use of a training pattern to calibrate an equalizing differential receiver in accordance with certain aspects disclosed herein.

The CTLE 1402, the negative offset 1434, and/or the programmable delay circuit 1410 may be configured and/or calibrated using a training pattern. FIGS. 15 and 16 illustrates the use of training patterns 1500, 1600 to calibrate the equalizing differential receiver 1400. The training pattern is generated by transmitting a three-phase signal in different phases on each of three wires 1502/1602, 1504/1604, 1506/1606. The training patterns 1500, 1600 may be configured to produce combinations of transitions that ensures equalization by the CTLE 1402 sufficient to enable reliable decoding of the three-phase signals in subsequent, normal operation. FIG. 15 illustrates an example where the equalizing differential receiver 1400 produces an output that has been sufficiently or optimally equalized, and FIG. 16 illustrates an example where the equalizing differential receiver 1400 produces an output that has been over-equalized. In some instances, a three-phase signal has been sufficiently or optimally equalized when a ratio of low-frequency attenuation to high-frequency amplification has been achieved that enables reliable decoding of the three-phase signal.

In FIG. 15, a negative offset 1508 is configured such that weak low levels 1510 are below the threshold for detecting low states. When the programmable delay circuit 1410 is calibrated, edges in the difference signal 1512 produced by the second slicer 1408 occur slightly before transitions in the delayed difference signal 1516, which is derived from the difference signal 1514 produced by the first slicer 1406. In this example, the first flipflop 1418 captures a logic 0 from the delayed difference signal 1516 at every positive transition in the difference signal 1512 produced by the second slicer 1408, and the second flipflop 1420 captures a logic one from the delayed difference signal 1516 at every negative transition in the difference signal 1512 produced by the second slicer 1408. The Even signal 1522 output by the first flipflop 1418 remains at logic zero and the Odd signal 1524 output by the second flipflop 1420 remains at logic one while the CTLE 1402 provides optimal or sufficient equalization. In certain implementations, a positive offset 1518 may be configured such that weak high levels 1520 exceed the threshold for detecting high states. The positive offset 1518 may be configured when a training pattern includes a sequence of: strong high, weak high, and then strong low, for example.

FIG. 16 illustrates an example of over-equalization. In FIG. 16, a negative offset 1608 is configured such that weak low levels 1610 are above the threshold for detecting low states. The first slicer 1406 does not detect all low states, while the second slicer accurately detects all low states. In this example, the first flipflop 1418 captures alternating logic 0 and logic 1 states from the delayed difference signal 1616 at every positive transition in the difference signal 1612 produced by the second slicer 1408. The second flipflop 1420 captures a logic one from the delayed difference signal 1616 at every negative transition in the difference signal 1612 produced by the second slicer 1408. The Even signal 1622 output by the first flipflop 1418 switches between logic zero and logic one, while the Odd signal 1624 output by the second flipflop 1420 remains at logic 1 indicating over-equalization. The sequence and combination of states of the Even signal 1622 and Odd signal 1624 may be used by the control block 1426 to configure and/or calibrate the CTLE 1402.

Figure 17:
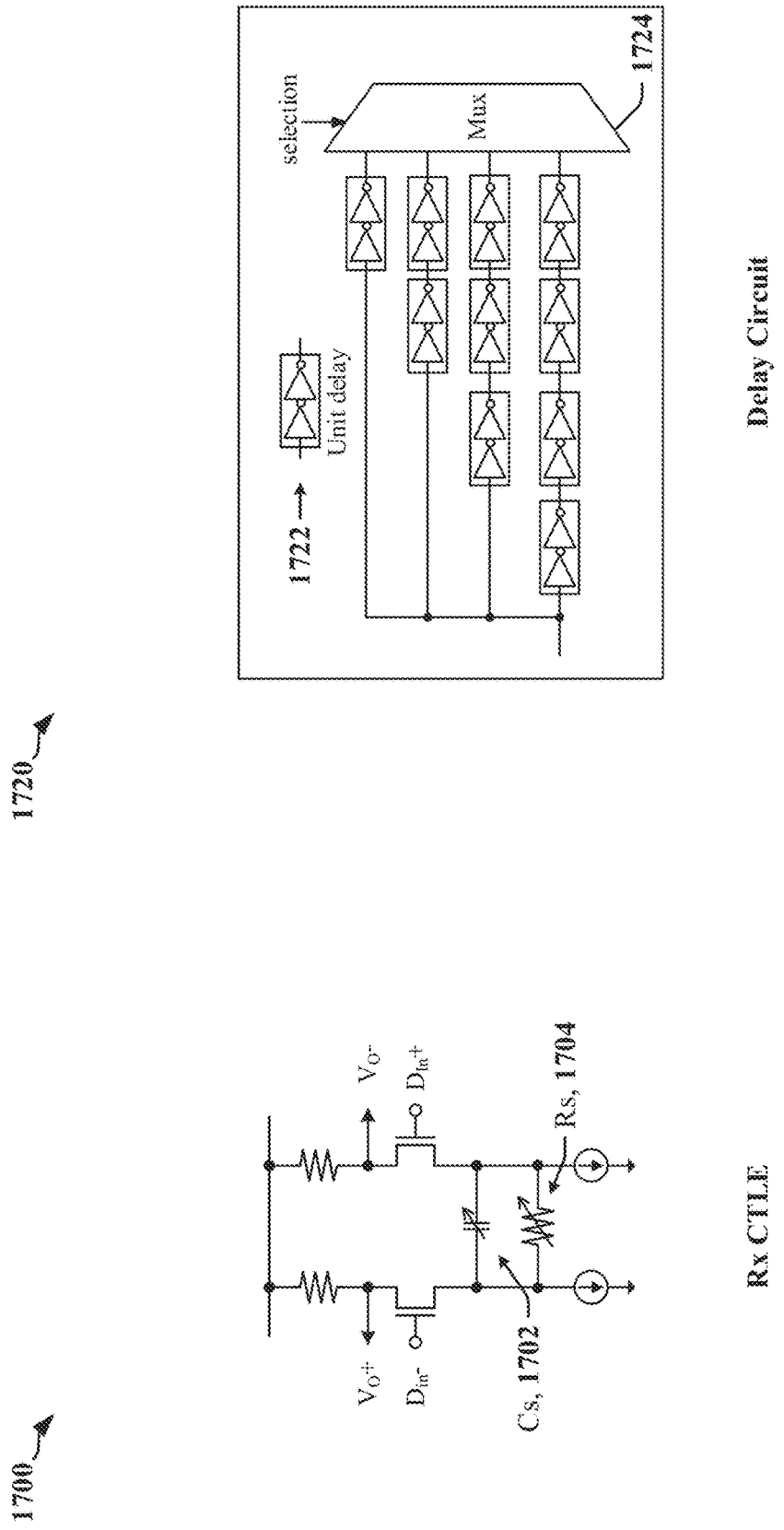
FIG. 17 illustrates an example of an equalizing differential receiver and a delay circuit that may be used in an equalizing differential receiver provided in accordance with certain aspects disclosed herein.

FIG. 17 illustrates examples of a CTLE circuit 1700 and a delay circuit 1720 that may be used in certain equalizing receivers. The CTLE circuit 1700 may include a programmable or adjustable capacitor 1702 and a programmable or adjustable resistor 1704 arranged as an RC degeneration circuit that may be configured by the control block 1426. The adjustable capacitor 1702 and adjustable resistor 1704 may define filtering characteristics of the CTLE circuit 1700. RC degeneration provides frequency peaking with the gain bandwidth of the amplifier as a limitation. The transfer function for the filter may be represented as H(s) as follows:

$$H(s) = \frac{g_m}{C_p} \times \frac{s + \frac{1}{R_S C_S}}{\left(s + \frac{1 + g_m R_{s/2}}{R_s C_s}\right)\left(s + \frac{1}{R_D C_P}\right)}.$$

The transfer function defines a zero frequency and poles as follows:

$$\omega_z = \frac{1}{R_s C_s}, \; \omega_{p1} = \frac{1 + g_m R_{s/2}}{R_s C_s}, \; \omega_{p2} = \frac{1}{R_D C_P}.$$

Equalization may be calibrated by tuning the RC degeneration circuit to adjust the zero frequency ($\omega_z$) and the first pole ($\omega_{p1}$), which set peaking and direct current (DC) gain. Increasing the value of $C_S$ moves the $\omega_z$ and $\omega_{p1}$ to a lower frequency without impacting peaking, which may be configured for ideal peaking. Increasing $R_S$ moves the zero frequency to a lower frequency and increases peaking by lowering DC gain.

The delay circuit 1720 may be implemented using a set of unit delay elements 1722 that can be concatenated in different numbers to provide different delay paths. A multiplexer 1724 may be used to select a delay by selecting one of the delay paths.

Figure 18:
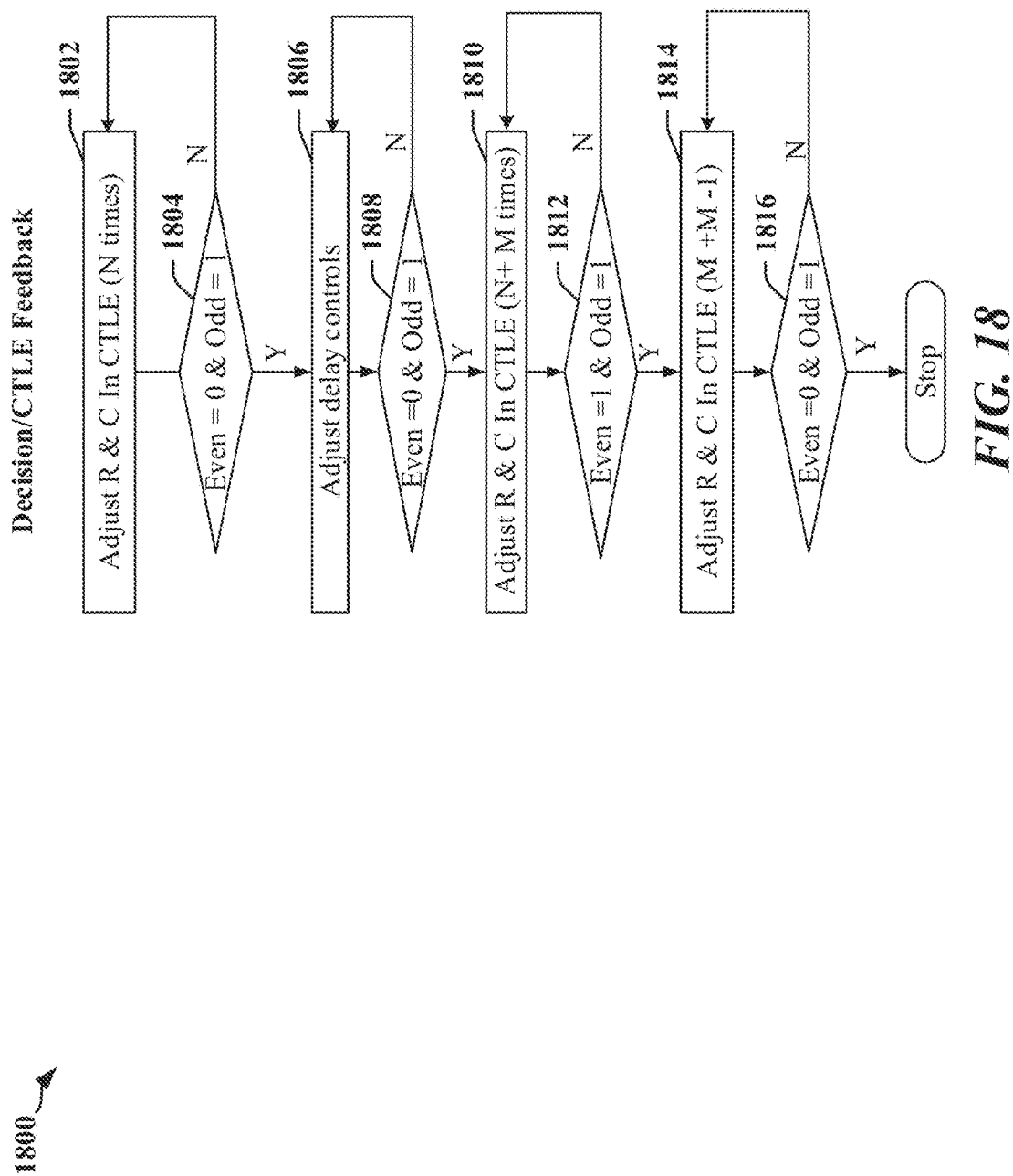
FIG. 18 is a flowchart that illustrates a calibration process for an equalizing differential receiver provided in accordance with certain aspects disclosed herein.

FIG. 18 is a flowchart 1800 that illustrates a calibration process for the equalizing differential receiver 1400. The control block 1426 may adjust resistance and/or capacitance values in the RC degeneration circuit at block 1802. At block 1804, the control block 1426 may determine if the Even signal 1522 is at logic zero while the Odd signal 1524 is at logic one indicating optimal or sufficient equalization. If optimal equalization has been indicated, or a preconfigured maximum number (N) of iterations of block 1802 has been performed, the control block 1426 may proceed to block 1806. Otherwise, the control block 1426 may continue at block 1802. In one example, optimal configuration may correspond to a ratio of low-frequency attenuation to high-frequency amplification that enables reliable decoding of three-phase signals by the equalizing differential receiver 1400.

At block 1806, the control block 1426 may initially adjust delay values provided by the programmable delay circuit 1410. At block 1808, the control block 1426 may determine if the Even signal 1522 is at logic zero while the Odd signal 1524 is at logic one indicating optimal or sufficient equalization. If optimal equalization has been indicated, the control block 1426 may proceed to block 1810. Otherwise, the control block 1426 may continue at block 1806.

At block 1810, the control block 1426 may adjust resistance and/or capacitance values in the RC degeneration circuit. At block 1812, the control block 1426 may determine if the Even signal 1522 is at logic one while the Odd signal 1524 is at logic one. If this condition occurs, or preconfigured maximum number (N+M) of iterations of block 1810 has been performed, the control block 1426 may proceed to block 1814. Otherwise, the control block 1426 may continue at block 1810.

At block 1814, the control block 1426 may adjust resistance and/or capacitance values in the RC degeneration circuit. At block 1816, the control block 1426 may determine if the Even signal 1522 is at logic zero while the Odd signal 1524 is at logic one. If this condition occurs, or preconfigured maximum number (M+M−1) of iterations of block 1814 has been performed, the control block 1426 may terminate the process. Otherwise, the control block 1426 may continue at block 1814.

Examples of Processing Circuits and Methods

Figure 19:
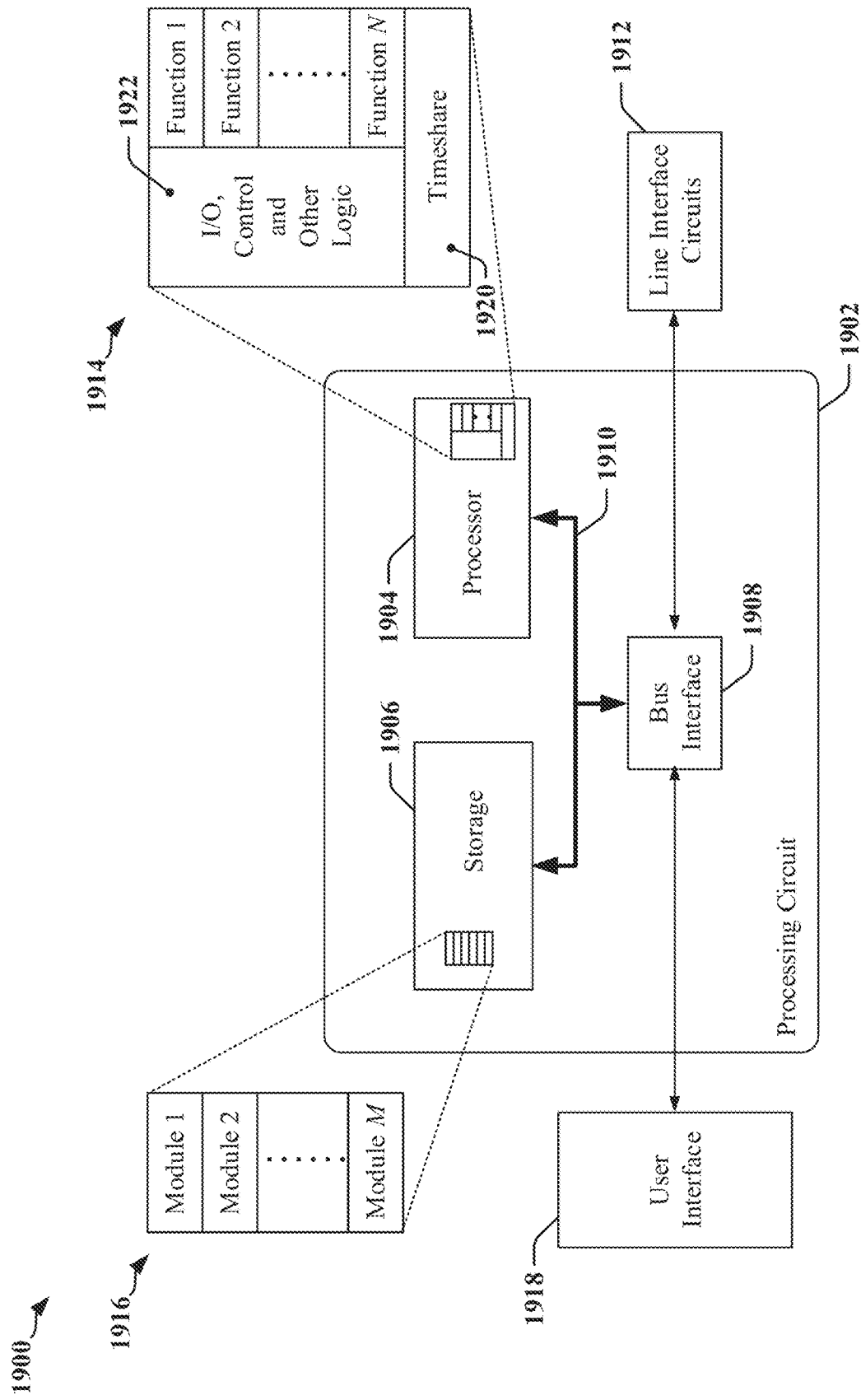
FIG. 19 illustrates an example of an apparatus employing a processing circuit that may be adapted according to certain aspects disclosed herein.

FIG. 19 is a conceptual diagram 1900 illustrating an example of a hardware implementation for an apparatus employing a processing circuit 1902 that may be configured to perform one or more functions disclosed herein. In accordance with various aspects of the disclosure, an element, or any portion of an element, or any combination of elements as disclosed herein may be implemented using the processing circuit 1902. The processing circuit 1902 may include one or more processors 1904 that are controlled by some combination of hardware and software modules. Examples of processors 1904 include microprocessors, microcontrollers, digital signal processors (DSPs), field programmable gate arrays (FPGAs), programmable logic devices (PLDs), state machines, sequencers, gated logic, discrete hardware circuits, and other suitable hardware configured to perform the various functionality described throughout this disclosure. The one or more processors 1904 may include specialized processors that perform specific functions, and that may be configured, augmented or controlled by one of the software modules 1916. The one or more processors 1904 may be configured through a combination of software modules 1916 loaded during initialization, and further configured by loading or unloading one or more software modules 1916 during operation.

In the illustrated example, the processing circuit 1902 may be implemented with a bus architecture, represented generally by the bus 1910. The bus 1910 may include any number of interconnecting buses and bridges depending on the specific application of the processing circuit 1902 and the overall design constraints. The bus 1910 links together various circuits including the one or more processors 1904, and storage 1906. Storage 1906 may include memory devices and mass storage devices, and may be referred to herein as computer-readable media and/or processor-readable media. The bus 1910 may also link various other circuits such as timing sources, timers, peripherals, voltage regulators, and power management circuits. A bus interface 1908 may provide an interface between the bus 1910 and one or more transceivers 1912. A transceiver 1912 may be provided for each networking technology supported by the processing circuit. In some instances, multiple networking technologies may share some or all of the circuitry or processing modules found in a transceiver 1912. Each transceiver 1912 provides a means for communicating with various other apparatus over a transmission medium. Depending upon the nature of the apparatus, a user interface 1918 (e.g., keypad, display, speaker, microphone, joystick) may also be provided, and may be communicatively coupled to the bus 1910 directly or through the bus interface 1908.

A processor 1904 may be responsible for managing the bus 1910 and for general processing that may include the execution of software stored in a computer-readable medium that may include the storage 1906. In this respect, the processing circuit 1902, including the processor 1904, may be used to implement any of the methods, functions and techniques disclosed herein. The storage 1906 may be used for storing data that is manipulated by the processor 1904 when executing software, and the software may be configured to implement any one of the methods disclosed herein.

One or more processors 1904 in the processing circuit 1902 may execute software. Software shall be construed broadly to mean instructions, instruction sets, code, code segments, program code, programs, subprograms, software modules, applications, software applications, software packages, routines, subroutines, objects, executables, threads of execution, procedures, functions, algorithms, etc., whether referred to as software, firmware, middleware, microcode, hardware description language, or otherwise. The software may reside in computer-readable form in the storage 1906 or in an external computer-readable medium. The external computer-readable medium and/or storage 1906 may include a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a "flash drive," a card, a stick, or a key drive), a random access memory (RAM), a ROM, a PROM, an erasable PROM (EPROM), an EEPROM, a register, a removable disk, and any other suitable medium for storing software and/or instructions that may be accessed and read by a computer. The computer-readable medium and/or storage 1906 may also include, by way of example, a carrier wave, a transmission line, and any other suitable medium for transmitting software and/or instructions that may be accessed and read by a computer. Computer-readable medium and/or the storage 1906 may reside in the processing circuit 1902, in the processor 1904, external to the processing circuit 1902, or be distributed across multiple entities including the processing circuit 1902. The computer-readable medium and/or storage 1906 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The storage 1906 may maintain software maintained and/or organized in loadable code segments, modules, applications, programs, etc., which may be referred to herein as software modules 1916. Each of the software modules 1916 may include instructions and data that, when installed or loaded on the processing circuit 1902 and executed by the one or more processors 1904, contribute to a run-time image 1914 that controls the operation of the one or more processors 1904. When executed, certain instructions may cause the processing circuit 1902 to perform functions in accordance with certain methods, algorithms and processes described herein.

Some of the software modules 1916 may be loaded during initialization of the processing circuit 1902, and these software modules 1916 may configure the processing circuit 1902 to enable performance of the various functions disclosed herein. For example, some software modules 1916 may configure internal devices and/or logic circuits 1922 of the processor 1904, and may manage access to external devices such as the transceiver 1912, the bus interface 1908, the user interface 1918, timers, mathematical coprocessors, and so on. The software modules 1916 may include a control program and/or an operating system that interacts with interrupt handlers and device drivers, and that controls access to various resources provided by the processing circuit 1902. The resources may include memory, processing time, access to the transceiver 1912, the user interface 1918, and so on.

One or more processors 1904 of the processing circuit 1902 may be multifunctional, whereby some of the software modules 1916 are loaded and configured to perform different functions or different instances of the same function. The one or more processors 1904 may additionally be adapted to manage background tasks initiated in response to inputs from the user interface 1918, the transceiver 1912, and device drivers, for example. To support the performance of multiple functions, the one or more processors 1904 may be configured to provide a multitasking environment, whereby each of a plurality of functions is implemented as a set of tasks serviced by the one or more processors 1904 as needed or desired. In one example, the multitasking environment may be implemented using a timesharing program 1920 that passes control of a processor 1904 between different tasks, whereby each task returns control of the one or more processors 1904 to the timesharing program 1920 upon completion of any outstanding operations and/or in response to an input such as an interrupt. When a task has control of the one or more processors 1904, the processing circuit is effectively specialized for the purposes addressed by the function associated with the controlling task. The timesharing program 1920 may include an operating system, a main loop that transfers control on a round-robin basis, a function that allocates control of the one or more processors 1904 in accordance with a prioritization of the functions, and/or an interrupt driven main loop that responds to external events by providing control of the one or more processors 1904 to a handling function.

Figure 20:
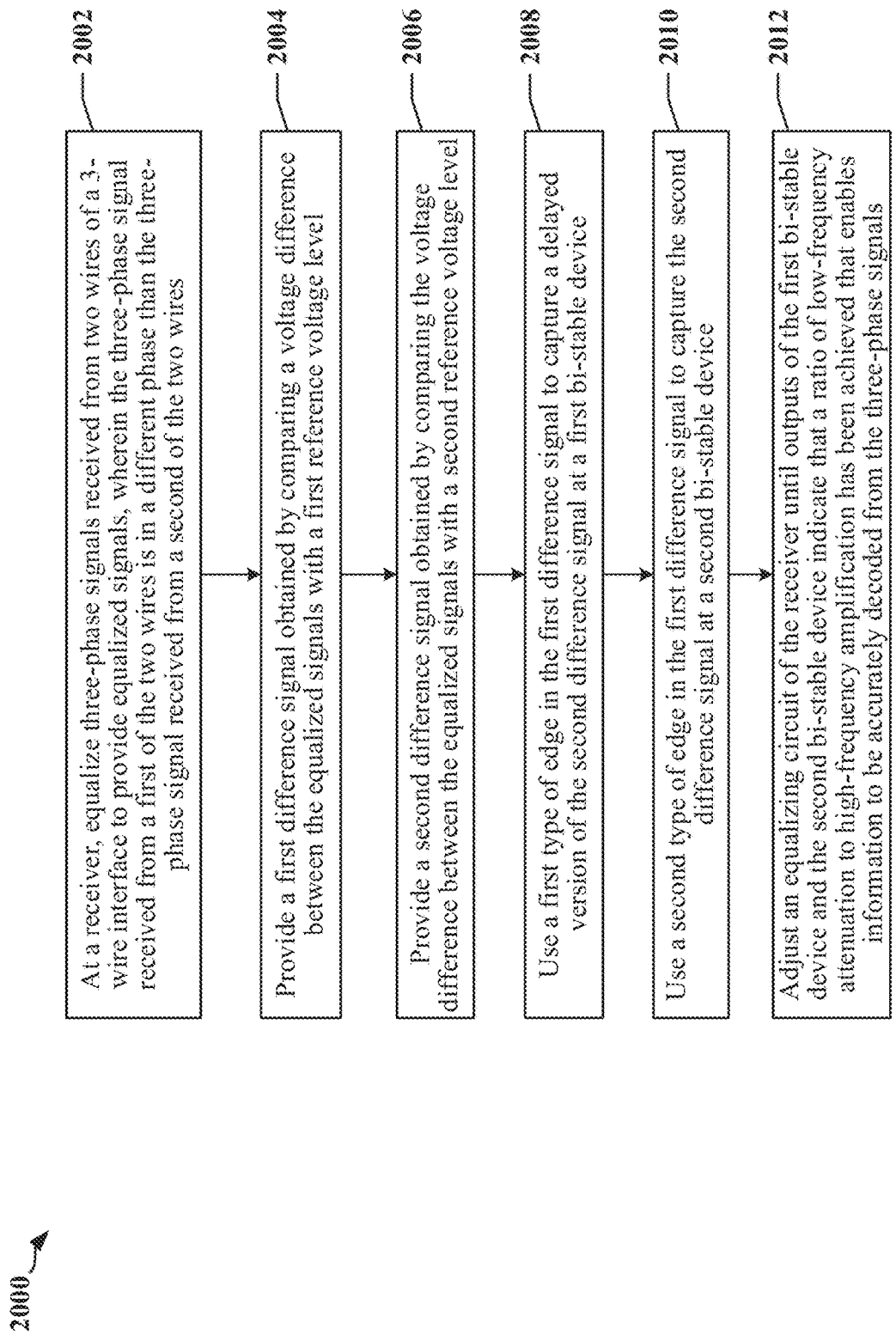
FIG. 20 is a flowchart of a method according to certain aspects disclosed herein.

FIG. 20 is a flowchart 2000 of an equalization method that may be performed by a receiver circuit in an apparatus coupled to a C-PHY 3-Phase interface for example.

At block 2002, the receiver circuit may equalize three-phase signals received from two wires of a 3-wire interface to provide equalized signals. The three-phase signal received from a first of the two wires is in a different phase than the three-phase signal received from a second of the two wires. In certain implementation, the three-phase signals may be received from a three-wire bus operated in accordance with a C-PHY protocol.

At block 2004, the receiver circuit may provide a first difference signal obtained by comparing a voltage difference between the equalized signals with a first reference voltage level, and at block 2006, the receiver circuit may provide a second difference signal obtained by comparing the voltage difference between the equalized signals with a second reference voltage level. The difference signals may be provided by slicers 1406, 1408, which may include or be implemented using comparators. The comparators may compare the difference voltage between its inputs with a programmable offset to obtain a decision and/or result at an output.

At block 2008, the receiver circuit may use a first type of edge in the first difference signal to capture a delayed version of the second difference signal at a first bi-stable device, and at block 2010, the receiver circuit may use a second type of edge in the first difference signal to capture the second difference signal at a second bi-stable device. The bi-stable devices may be implemented using flipflops, latches, registers, keeper circuit or another type of logic device.

At block 2012, the receiver circuit may adjust an equalizing circuit of the receiver until outputs of the first bi-stable device and the second bi-stable device indicate that a ratio of low-frequency attenuation to high-frequency amplification has been achieved that enables information to be accurately decoded from the three-phase signals. Decoding of the three-phase signals may be reliable when information can be accurately decoded from the three-phase signals. The equalizing circuit of the receiver may be adjusted by modifying a resistance value and/or a capacitance value of the equalizing circuit. In various examples, the equalizing circuit of the receiver is adjusted while a training pattern is received in the three-phase signals.

In certain examples, the receiver circuit may iteratively adjust a delay period used to produce the delayed version of the second difference signal. In one example, the receiver circuit may adjust the delay period while adjusting the equalizing circuit. In another example, the receiver circuit may adjust the delay period before adjusting the equalizing circuit of the receiver. In some instances, the delay period may be adjusted until the outputs of the first bi-stable device and the second bi-stable device indicate that the ratio of low-frequency attenuation to high-frequency amplification enables information to be accurately decoded from the three-phase signals.

In certain examples, the first reference voltage level corresponds to a middle voltage level at a midpoint between maximum and minimum voltage levels specified for the first difference signal and the second difference signal. For instance, the middle voltage level may be zero volts when the difference signals can switch between +V and −V. The second reference voltage level may be offset from the middle voltage level.

In one example, the first bi-stable device is implemented using a flipflop that responds to negative-to-positive transitions in the first difference signal and the second bi-stable device is implemented using a flipflop that responds to positive-to-negative transitions in the first difference signal.

In one example, the equalizing circuit of the receiver is adjusted until outputs of the first bi-stable device and the second bi-stable device have opposite binary values.

Figure 21:
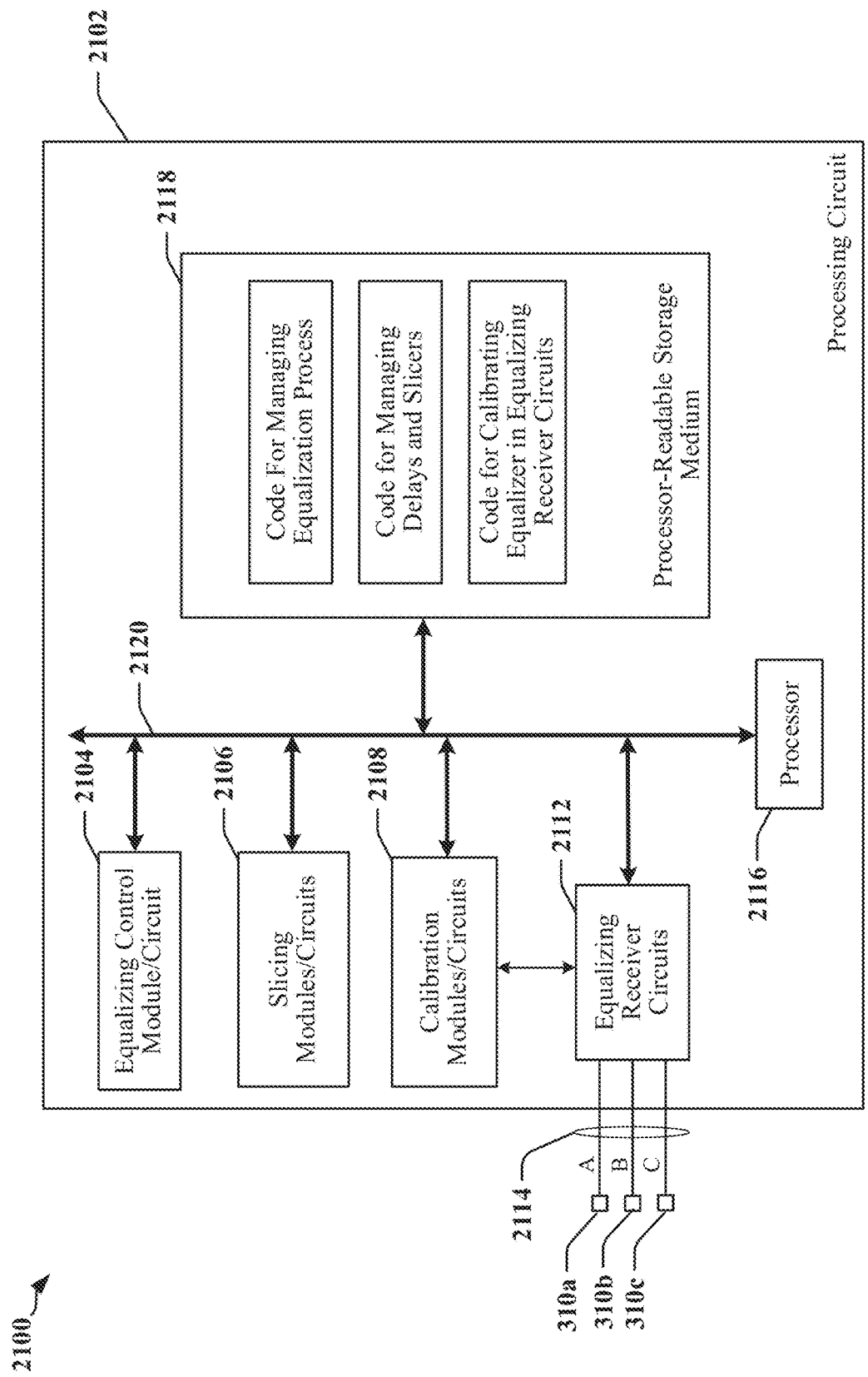
FIG. 21 is a diagram illustrating an example of a hardware implementation for an apparatus that can perform clock calibration in accordance with certain aspects disclosed herein.

FIG. 21 is a diagram illustrating an example of a hardware implementation for an apparatus 2100 employing a processing circuit 2102. The processing circuit typically has a processor 2116 that may include one or more of a microprocessor, microcontroller, digital signal processor, a sequencer and a state machine. The processing circuit 2102 may be implemented with a bus architecture, represented generally by the bus 2120. The bus 2120 may include any number of interconnecting buses and bridges depending on the specific application of the processing circuit 2102 and the overall design constraints. The bus 2120 links together various circuits including one or more processors and/or hardware modules, represented by the processor 2116, the modules or circuits 2104, 2106 and 2108, difference receiver circuits 2112 that determine difference signaling state between different pairs of the connectors or wires 2114 and the computer-readable storage medium 2118. The bus 2120 may also link various other circuits such as timing sources, peripherals, voltage regulators, and power management circuits, which are well known in the art, and therefore, will not be described any further.

The processor 2116 is responsible for general processing, including the execution of software stored on the computer-readable storage medium 2118. The software, when executed by the processor 2116, causes the processing circuit 2102 to perform the various functions described supra for any particular apparatus. The computer-readable storage medium 2118 may also be used for storing data that is manipulated by the processor 2116 when executing software, including data decoded from symbols transmitted over the connectors or wires 2114, which may be configured as data lanes and clock lanes. The processing circuit 2102 further includes at least one of the modules 2104, 2106 and 2108. The modules 2104, 2106 and 2108 may be software modules running in the processor 2116, resident/stored in the computer-readable storage medium 2118, one or more hardware modules coupled to the processor 2116, or some combination thereof. The modules 2104, 2106 and/or 2108 may include microcontroller instructions, state machine configuration parameters, or some combination thereof.

In one configuration, the apparatus 2100 may be configured for data communication over a C-PHY 3-phase interface. The apparatus 2100 may include a module and/or circuit 2104 that is configured to manage an equalization procedure, including when a training pattern is transmitted on the C-PHY 3-phase interface. The apparatus 2100 may include modules and/or circuits 2106 configured to provide difference signals and/or switching decisions. The modules and/or circuits 2106 may include slicers and/or comparators. The apparatus 2100 may include modules and/or circuits 2108 that configure one or more equalization circuits. The modules and/or circuits 2108 may include a controller that can manipulate capacitance and resistance values that modify a transfer function of an equalizing filter, for example.

In one example, the apparatus 2100 implements a bus interface device configured to provide difference signals, each difference signal representative of a difference in signaling state between a pair of wires in the 3-wire interface. The apparatus 2100 may include an equalizing receiver configured to provide equalized signals from three-phase signals received from two wires of a 3-wire interface. Here, the three-phase signal received from a first of the two wires is in a different phase than the three-phase signal received from a second of the two wires. The apparatus 2100 may include a first comparator configured to provide a first difference signal obtained by comparing a voltage difference between the equalized signals with a first reference voltage level, and a second comparator configured to provide a second difference signal obtained by comparing the voltage difference between the equalized signals with a second reference voltage level. The apparatus 2100 may include a first bi-stable device configured to capture a delayed version of the second difference signal as an output in response to a first type of edge in the first difference signal, and a second bi-stable device configured to capture the second difference signal as an output in response to a second type of edge in the first difference signal. The apparatus 2100 may include a control block configured to adjust equalization parameters of the equalizing receiver until the outputs of the first bi-stable device and the second bi-stable device indicate that a ratio of low-frequency attenuation to high-frequency amplification has been achieved that enables information to be accurately decoded from the three-phase signals. The control block may include or be implemented by the processor 2116.

In some instances, the equalization parameters of the equalizing receiver are adjusted while a training pattern is received in the three-phase signals. The control block may be further configured to iteratively adjust a delay period used to produce the delayed version of the second difference signal. The delay value may be adjusted before, after or while adjusting the equalization parameters of the equalizing receiver. The delay value may be provided by the delay circuit 1720, and the delay value may be adjusted using the multiplexer 1724 to select between delay lines. In some examples, the delay period iteratively adjusting the outputs of the first bi-stable device and the second bi-stable device may result in three-phase signals that are equalized sufficiently to enable reliable decoding of the three-phase signals. The delay period may be iteratively adjusted until the outputs of the first bi-stable device and the second bi-stable device indicate that the ratio of low-frequency attenuation to high-frequency amplification enables information to be accurately decoded from the three-phase signals.

In various examples, the equalization parameters of the equalizing receiver include a resistance value or a capacitance value. For example, the capacitance value of the capacitor 1702 and/or the resistance value of the resistor 1704 in the CTLE circuit 1700 of FIG. 7 may be adjusted.

In some examples, the first reference voltage level corresponds to a middle voltage level at a midpoint between maximum and minimum voltage levels specified for the first difference signal and the second difference signal, and the second reference voltage level is offset from the middle voltage level.

The bi-stable devices may correspond to the flipflops 1418, 1420 of FIG. 14, which respond to different transitions (negative-to-positive and positive-to-negative transitions) in the first difference signal (e.g., difference signal 1412). The equalization parameters of the equalizing receiver may be adjusted until outputs of the flipflops 1418, 1420 have opposite binary values.

The computer-readable storage medium 2118 may be a non-transitory storage medium and may store code that, when executed by one or more processors, causes the one or more processors to equalize three-phase signals received from two wires of a 3-wire interface to provide equalized signals, provide a first difference signal obtained by comparing a voltage difference between the equalized signals with a first reference voltage level, provide a second difference signal obtained by comparing the voltage difference between the equalized signals with a second reference voltage level, use a first type of edge in the first difference signal to capture a delayed version of the second difference signal at a first bi-stable device, use a second type of edge in the first difference signal to capture the second difference signal at a second bi-stable device, and adjust an equalizing circuit of the receiver until outputs of the first bi-stable device and the second bi-stable device indicate that a ratio of low-frequency attenuation to high-frequency amplification has been achieved that enables information to be accurately decoded from the three-phase signals. The three-phase signal received from a first of the two wires is in a different phase than the three-phase signal received from a second of the two wires.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of equalization, comprising:
   at a receiver, equalizing three-phase signals received from two wires of a 3-wire interface to provide equalized signals, wherein the three-phase signal received from a first of the two wires is in a different phase than the three-phase signal received from a second of the two wires;
   providing a first difference signal obtained by comparing a voltage difference between the equalized signals with a first reference voltage level;
   providing a second difference signal obtained by comparing the voltage difference between the equalized signals with a second reference voltage level;
   using a first type of edge in the first difference signal to capture a delayed version of the second difference signal at a first bi-stable device;
   using a second type of edge in the first difference signal to capture the second difference signal at a second bi-stable device; and
   adjusting an equalizing circuit of the receiver until outputs of the first bi-stable device and the second bi-stable device indicate that a ratio of low-frequency attenuation to high-frequency amplification has been achieved that enables information to be accurately decoded from the three-phase signals.

2. The method of claim 1, wherein the equalizing circuit of the receiver is adjusted while a training pattern is received in the three-phase signals.

3. The method of claim 1, further comprising:
   iteratively adjusting a delay period used to produce the delayed version of the second difference signal while adjusting the equalizing circuit of the receiver until the outputs of the first bi-stable device and the second bi-stable device indicate that the ratio of low-frequency attenuation to high-frequency amplification enables information to be accurately decoded from the three-phase signals.

4. The method of claim 1, further comprising:
   iteratively adjusting a delay period used to produce the delayed version of the second difference signal before adjusting the equalizing circuit of the receiver until the outputs of the first bi-stable device and the second bi-stable device indicate that the ratio of low-frequency attenuation to high-frequency amplification enables information to be accurately decoded from the three-phase signals.

5. The method of claim 1, wherein adjusting the equalizing circuit of the receiver comprises:
   modifying a resistance value or a capacitance value of the equalizing circuit.

6. The method of claim 1, wherein the first reference voltage level corresponds to a middle voltage level at a midpoint between maximum and minimum voltage levels specified for the first difference signal and the second difference signal, and wherein the second reference voltage level is offset from the middle voltage level.

7. The method of claim 1, wherein the first bi-stable device comprises a flipflop that responds to negative-to-positive transitions in the first difference signal and the second bi-stable device comprises a flipflop that responds to positive-to-negative transitions in the first difference signal.

8. The method of claim 1, wherein the equalizing circuit of the receiver is adjusted until the outputs of the first bi-stable device and the second bi-stable device have opposite binary values.

9. A bus interface device, comprising:
an equalizing receiver configured to provide equalized signals from three-phase signals received from two wires of a 3-wire interface, wherein the three-phase signal received from a first of the two wires is in a different phase than the three-phase signal received from a second of the two wires;
a first comparator configured to provide a first difference signal obtained by comparing a voltage difference between the equalized signals with a first reference voltage level;
a second comparator configured to provide a second difference signal obtained by comparing the voltage difference between the equalized signals with a second reference voltage level;
a first bi-stable device configured to capture a delayed version of the second difference signal as an output in response to a first type of edge in the first difference signal;
a second bi-stable device configured to capture the second difference signal as an output in response to a second type of edge in the first difference signal; and
a control block configured to adjust equalization parameters of the equalizing receiver until outputs of the first bi-stable device and the second bi-stable device indicate that a ratio of low-frequency attenuation to high-frequency amplification has been achieved that enables information to be accurately decoded from the three-phase signals.

10. The bus interface device of claim 9, wherein the equalization parameters of the equalizing receiver are adjusted while a training pattern is received in the three-phase signals.

11. The bus interface device of claim 9, wherein the control block is further configured to:
iteratively adjust a delay period used to produce the delayed version of the second difference signal while adjusting the equalization parameters of the equalizing receiver, until the outputs of the first bi-stable device and the second bi-stable device indicate that the ratio of low-frequency attenuation to high-frequency amplification enables information to be accurately decoded from the three-phase signals.

12. The bus interface device of claim 9, wherein the control block is further configured to:
iteratively adjust a delay period used to produce the delayed version of the second difference signal before adjusting the equalization parameters of the equalizing receiver, until the outputs of the first bi-stable device and the second bi-stable device indicate that the ratio of low-frequency attenuation to high-frequency amplification enables information to be accurately decoded from the three-phase signals.

13. The bus interface device of claim 9, wherein the equalization parameters of the equalizing receiver comprise a resistance value or a capacitance value.

14. The bus interface device of claim 9, wherein the first reference voltage level corresponds to a middle voltage level at a midpoint between maximum and minimum voltage levels specified for the first difference signal and the second difference signal, and wherein the second reference voltage level is offset from the middle voltage level.

15. The bus interface device of claim 9, wherein the first bi-stable device comprises a flipflop that responds to negative-to-positive transitions in the first difference signal and the second bi-stable device comprises a flipflop that responds to positive-to-negative transitions in the first difference signal.

16. The bus interface device of claim 9, wherein the equalization parameters of the equalizing receiver are adjusted until the outputs of the first bi-stable device and the second bi-stable device have opposite binary values.

17. A receiving apparatus comprising:
means for equalizing three-phase signals received from two wires of a 3-wire interface to provide equalized signals, wherein the three-phase signal received from a first of the two wires is in a different phase than the three-phase signal received from a second of the two wires;
means for providing a first difference signal obtained by comparing a voltage difference between the equalized signals with a first reference voltage level;
means for providing a second difference signal obtained by comparing the voltage difference between the equalized signals with a second reference voltage level;
means for capturing difference signals, including:
a first bi-stable device configured to use a first type of edge in the first difference signal to capture a delayed version of the second difference signal; and
a second bi-stable device configured to use a second type of edge in the first difference signal to capture the second difference signal; and
means for adjusting an equalizing circuit of the receiving apparatus, configured to adjust one or more equalization parameters until outputs of the first bi-stable device and the second bi-stable device indicate that a ratio of low-frequency attenuation to high-frequency amplification has been achieved that enables information to be accurately decoded from the three-phase signals.

18. The receiving apparatus of claim 17, wherein the equalizing circuit of the receiving apparatus is adjusted while a training pattern is received in the three-phase signals.

19. The receiving apparatus of claim 17, wherein the means for adjusting the equalizing circuit is configured to:
iteratively adjust a delay period used to produce the delayed version of the second difference signal while adjusting the one or more equalization parameters, and until the outputs of the first bi-stable device and the second bi-stable device indicate that the ratio of low-frequency attenuation to high-frequency amplification enables information to be accurately decoded from the three-phase signals.

20. The receiving apparatus of claim 17, wherein the means for adjusting the equalizing circuit is configured to:
modify a resistance value or a capacitance value of the equalizing circuit.

21. The receiving apparatus of claim 17, wherein the first reference voltage level corresponds to a middle voltage level at a midpoint between maximum and minimum voltage levels specified for the first difference signal and the second difference signal, and wherein the second reference voltage level is offset from the middle voltage level.

22. The receiving apparatus of claim 17, wherein the first bi-stable device comprises a flipflop that responds to negative-to-positive transitions in the first difference signal and the second bi-stable device comprises a flipflop that responds to positive-to-negative transitions in the first difference signal, and wherein the equalizing circuit of the receiving apparatus is adjusted until the outputs of the first bi-stable device and the second bi-stable device have opposite binary values.

23. A non-transitory processor-readable storage medium having one or more instructions which, when executed by at least one processor of a processing circuit in a receiver, cause the receiver to:
   equalize three-phase signals received from two wires of a 3-wire interface to provide equalized signals, wherein the three-phase signal received from a first of the two wires is in a different phase than the three-phase signal received from a second of the two wires;
   provide a first difference signal obtained by comparing a voltage difference between the equalized signals with a first reference voltage level;
   provide a second difference signal obtained by comparing the voltage difference between the equalized signals with a second reference voltage level;
   use a first type of edge in the first difference signal to capture a delayed version of the second difference signal at a first bi-stable device;
   use a second type of edge in the first difference signal to capture the second difference signal at a second bi-stable device; and
   adjust an equalizing circuit of the receiver until outputs of the first bi-stable device and the second bi-stable device indicate that a ratio of low-frequency attenuation to high-frequency amplification has been achieved that enables information to be accurately decoded from the three-phase signals.

24. The storage medium of claim 23, wherein the equalizing circuit of the receiver is adjusted while a training pattern is received in the three-phase signals.

25. The storage medium of claim 23, further comprising instructions which cause the receiver to:
   iteratively adjust a delay period used to produce the delayed version of the second difference signal while adjusting the equalizing circuit of the receiver until the outputs of the first bi-stable device and the second bi-stable device indicate that a ratio of low-frequency attenuation to high-frequency amplification has been achieved that enables information to be accurately decoded from the three-phase signals.

26. The storage medium of claim 23, further comprising instructions which cause the receiver to:
   iteratively adjust a delay period used to produce the delayed version of the second difference signal before adjusting the equalizing circuit of the receiver until the outputs of the first bi-stable device and the second bi-stable device indicate that a ratio of low-frequency attenuation to high-frequency amplification has been achieved that enables information to be accurately decoded from the three-phase signals.

27. The storage medium of claim 23, further comprising instructions which cause the receiver to:
   modify a resistance value or a capacitance value of the equalizing circuit while adjusting the equalizing circuit of the receiver.

28. The storage medium of claim 23, wherein the first reference voltage level corresponds to a middle voltage level at a midpoint between maximum and minimum voltage levels specified for the first difference signal and the second difference signal, and wherein the second reference voltage level is offset from the middle voltage level.

29. The storage medium of claim 23, wherein the first bi-stable device comprises a flipflop that responds to negative-to-positive transitions in the first difference signal and the second bi-stable device comprises a flipflop that responds to positive-to-negative transitions in the first difference signal.

30. The storage medium of claim 23, wherein the equalizing circuit of the receiver is adjusted until the outputs of the first bi-stable device and the second bi-stable device have opposite binary values.

* * * * *